US012651188B2

(12) United States Patent  
Cubitt et al.

(10) Patent No.: US 12,651,188 B2  
(45) Date of Patent: Jun. 9, 2026

(54) CONTROL SEQUENCE FOR QUANTUM COMPUTER

(71) Applicant: Phasecraft Limited, London (GB)

(72) Inventors: Toby Cubitt, London (GB); Laura Clinton, London (GB); Johannes Bausch, London (GB)

(73) Assignee: Phasecraft Limited, London (GB)

( * ) Notice: Subject to any disclaimer, the term of this patent is extended or adjusted under 35 U.S.C. 154(b) by 929 days.

(21) Appl. No.: 17/639,560

(22) PCT Filed: Feb. 3, 2021

(86) PCT No.: PCT/GB2021/050228  
§ 371 (c)(1),  
(2) Date: Mar. 1, 2022

(87) PCT Pub. No.: WO2021/160988  
PCT Pub. Date: Aug. 19, 2021

(65) Prior Publication Data  
US 2022/0383178 A1 Dec. 1, 2022

(30) Foreign Application Priority Data

Feb. 13, 2020 (GB) ...................................... 2001983

(51) Int. Cl.  
*G06N 10/60* (2022.01)  
*G06N 10/20* (2022.01)  
*G06N 10/40* (2022.01)

(52) U.S. Cl.  
CPC ............. *G06N 10/60* (2022.01); *G06N 10/20* (2022.01); *G06N 10/40* (2022.01)

(58) Field of Classification Search  
None  
See application file for complete search history.

(56) References Cited

U.S. PATENT DOCUMENTS

| | | | |
|---|---|---|---|
| 2007/0162262 A1 | 7/2007 | Tucci | |
| 2020/0387822 A1* | 12/2020 | Kilmov | ................... G06F 15/82 |
| 2020/0394544 A1* | 12/2020 | Low | ....................... G06N 10/20 |

FOREIGN PATENT DOCUMENTS

WO 2019226467 A1 11/2019

OTHER PUBLICATIONS

Reiner et al., "Effects of Gate Errors in Digital Quantum Simulations of Fermionic Systems," in 3 Quantum Sci. Tech. 045008 (2018). (Year: 2018).*

(Continued)

*Primary Examiner* — Ryan C Vaughn  
(74) *Attorney, Agent, or Firm* — Kilpatrick Townsend & Stockton LLP

(57) ABSTRACT

A method is provided for determining a control sequence for performing a multiqudit algorithm on a quantum computer, the multi-qudit algorithm expressible as a series of one or more k-qudit interactions. The method comprises, for each of the k-qudit interactions, decomposing the k-qudit interaction into a sequence of single-qudit unitary rotations and/or two-qudit unitary rotations from the continuous family of controllable unitary rotations generated by underlying physical interactions in the hardware of the quantum computer subject to a specified minimum interaction time, said sequence being physically implementable on the quantum computer. The method further comprises combining the sequences to form a combined interaction sequence. The method further comprises determining, based on the combined interaction sequence, the control sequence for performing the multiqudit algorithm on the quantum computer. The method may comprise, after the combining step, repeating the combined interaction sequence at least once to form a repeated interaction sequence. Determining the control sequence may comprise determining the control sequence based on the repeated sequence. The method is particularly (Continued)

*300*

For each of the k-qudit interactions, decompose the k-qudit interaction into a sequence consisting of single qudit unitary rotations and/or two-qudit unitary rotations physically implementable on the quantum computer — 302

Combine the sequences to form a combined interaction sequence — 304

Determine, based on the combined interaction sequence, the control sequence for performing the multiqudit algorithm on the quantum computer — 306 suitable for performing simulations of the effects of Hamiltonians. Computer-readable media and computing apparatuses are also described.

14 Claims, 14 Drawing Sheets

(56)            References Cited

OTHER PUBLICATIONS

Clinton, et al., "Hamiltonian Simulation Algorithms for Near-Term Quantum Hardware", Nature Communications, vol. 12, Mar. 15, 2020, 76 pages.
GB2001983.2, "Combined Search and Examination Report", Jul. 15, 2020, 9 pages.
Gokhale, et al., "Partial Compilation of Variational Algorithms for Noisy Intermediate-Scale Quantum Machines", Quantum Physics, arXiv:1909.07522, Oct. 12-16, 2019, 13 pages.

Klco, et al., "Digitization of Scalar Fields for Quantum Computing", arXiv:1808.10378, Available Online at: https://arxiv.org/pdf/1808.10378.pdf, Aug. 30, 2018, 52 pages.
Maslov, "Basic Circuit Compilation Techniques for an lon-trap Quantum Machine", New Journal of Physics, vol. 19, Feb. 20, 2017, 16 pages.
PCT/GB2021/050228, "International Search Report and Written Opinion", Apr. 23, 2021, 18 pages.
Reiner, et al., "Effects of Gate Errors in Digital Quantum Simulations of Fermionic Systems", arXiv:1804.06668, Available Online at: https://arxiv.org/pdf/1804.06668.pdf, Apr. 18, 2018, 14 pages.
Tacchino, et al., "Quantum Computers as Universal Quantum Simulators: State-of-art and Perspectives", arXiv:1907.03505, Available Online at: https://arxiv.org/pdf/1907.03505.pdf, Jul. 8, 2019, 28 pages.
Cubitt, et al., "Complexity Classification of Local Hamiltonian Problems", Available online at: https://arxiv.org/pdf/1311.3161, Mar. 27, 2016, pp. 1-50.
GB2001983.2, "Examination Report", Aug. 1, 2024, 19 pages.
Kempe, et al., "The Complexity of the Local Hamiltonian Problem", Society for Industrial and Applied Mathematics (SIAM) Journal on Computing, vol. 35, No. 5, 2006, pp. 1070-1097.

* cited by examiner

100

Figure 3:
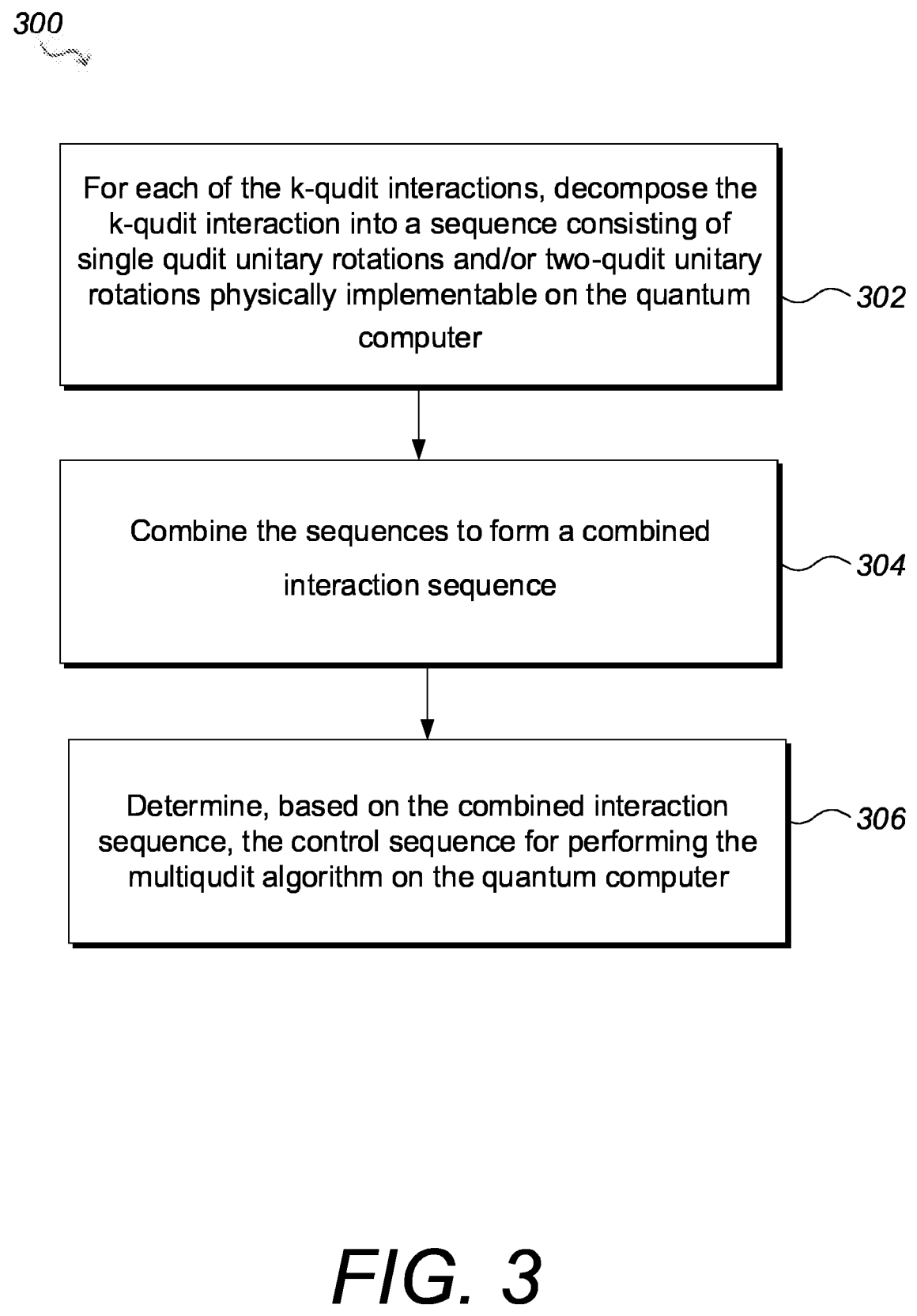

300

For each of the k-qudit interactions, decompose the k-qudit interaction into a sequence consisting of single qudit unitary rotations and/or two-qudit unitary rotations physically implementable on the quantum computer — 302

Combine the sequences to form a combined interaction sequence — 304

Determine, based on the combined interaction sequence, the control sequence for performing the multiqudit algorithm on the quantum computer — 306

Receive or generate a control sequence for performing a multiqudit algorithm on a quantum computer ⟶ 602

Execute the control sequence ⟶ 604

Control, based on the executed control sequence, an interaction means for interacting with qudits on the quantum computer ⟶ 606

48 Qubits with diagonal NN connectivity

| | coupling $\mathbf{h}$ | decomposition of $\mathbf{U} = \exp(iT\mathbf{h})$ | pulse times $t_i$ |
|---|---|---|---|
| known | $\sigma^z \otimes \sigma^z \otimes \sigma^z$ | $\mathbf{A}^\dagger \mathbf{B} \mathbf{A}$ <br> $\mathbf{A} := \exp(it_1\sigma^z \otimes \sigma^x \otimes \mathbb{1})$ <br> $\mathbf{B} := \exp(it_2\mathbb{1} \otimes \sigma^y \otimes \sigma^z)$ | <br> $t_1 = \frac{\pi}{4}$ <br> $t_2 = T$ |
| depth 4 | $\sigma^z \otimes \sigma^z \otimes \sigma^z$ | $\mathbf{A}_1 \mathbf{B}_2 \mathbf{A}_2 \mathbf{B}_1$ <br> $\mathbf{A}_i := \exp(it_i\sigma^z \otimes \sigma^x \otimes \mathbb{1})$ <br> $\mathbf{B}_i := \exp(it_i\mathbb{1} \otimes \sigma^y \otimes \sigma^z)$ | $\sin(2t_1) + \sin(2t_2)\cos(2t_1) = 0$ <br> $\sin(2t_1)\sin(2t_2) + \sin(T) + \cos(T) = \cos(2t_1)$ <br> $\cos(T) = \cos(2t_2) + \sin(T)$ |
| depth 5 | $\sigma^z \otimes \sigma^z \otimes \sigma^z$ | $\mathbf{B}_1 \mathbf{A}_\phi^\dagger \mathbf{B}_2 \mathbf{A}_\phi \mathbf{B}_1$ <br> $\mathbf{A}_\phi := \exp(i\phi\sigma^z \otimes \sigma^x \otimes \mathbb{1})$ <br> $\mathbf{B}_i := \exp(it_i\mathbb{1} \otimes \sigma^y \otimes \sigma^z)$ | $\sin(t_2)\cos(2t_1)\cos(2\phi) + \sin(2t_1)\cos(t_2) = 0$ <br> $\sin(T) = \sin(t_2)\sin(2\phi)$ <br> $\sin(2t_1)\sin(t_2)\cos(2\phi) + \cos(T) = \cos(2t_1)\cos(t_2)$ |
| known | $\bigotimes_{i=1}^{k} \sigma_z^i$ | $\mathbf{A}^\dagger \mathbf{B} \mathbf{A}$ <br> $\mathbf{A} := \exp(it_1 \bigotimes_{i=1}^{j-1} \sigma_z^i \otimes \sigma_x^j)$ <br> $\mathbf{B} := \exp(it_2\sigma_y^j \bigotimes_{i=j+1}^{k} \sigma_z^i)$ | <br> $t_1 = \frac{\pi}{4}$ <br> $t_2 = T$ |
| depth 4 | $\bigotimes_{i=1}^{k} \sigma_z^i$ | $\mathbf{A}_1 \mathbf{B}_2 \mathbf{A}_2 \mathbf{B}_1$ <br> $\mathbf{A}_i := \exp(it_i \bigotimes_{i=1}^{j-1} \sigma_z^i \otimes \sigma_x^j)$ <br> $\mathbf{B}_i := \exp(it_i\sigma_y^j \bigotimes_{i=j+1}^{k} \sigma_z^i)$ | $\sin(2t_1) + \sin(2t_2)\cos(2t_1) = 0$ <br> $\sin(2t_1)\sin(2t_2) + \sin(T) + \cos(T) = \cos(2t_1)$ <br> $\cos(T) = \cos(2t_2) + \sin(T)$ |
| depth 5 | $\bigotimes_{i=1}^{k} \sigma_z^i$ | $\mathbf{B}_1 \mathbf{A}_\phi^\dagger \mathbf{B}_2 \mathbf{A}_\phi \mathbf{B}_1$ <br> $\mathbf{A}_\phi := \exp(i\phi \bigotimes_{i=1}^{j-1} \sigma_z^i \otimes \sigma_x^j)$ <br> $\mathbf{B}_i := \exp(it_i\sigma_y^j \bigotimes_{i=j+1}^{k} \sigma_z^i)$ | $\sin(t_2)\cos(2t_1)\cos(2\phi) + \sin(2t_1)\cos(t_2) = 0$ <br> $\sin(T) = \sin(t_2)\sin(2\phi)$ <br> $\sin(2t_1)\sin(t_2)\cos(2\phi) + \cos(T) = \cos(2t_1)\cos(t_2)$ |

*FIG. 9*

CONTROL SEQUENCE FOR QUANTUM COMPUTER

TECHNICAL FIELD

The present disclosure relates to quantum computing, and in particular, to methods for determining control sequences to perform quantum algorithms using quantum information processors/quantum computers, and the application of those control sequences.

BACKGROUND

A quantum computer is a device that processes quantum information, which is a generalisation of classical information (such as discrete classical bits i.e. O's and 1's) that classical computers process. A quantum computer has the potential to be far more powerful than a classical computer for at least some processes because certain operations can be performed much more efficiently.

In a computer for the processing of quantum bits, otherwise known as "qubits", each qubit can be placed in one of two orthogonal states. However, due to the nature of quantum bits, they can also be placed in a superposition of these two orthogonal states. If every logical qubit of a computer is placed in a suitable superposition of states, the overall superposition of states in the computer scales as $2^n$ where n is the number of logical qubits. Amongst other effects such as quantum entanglement, quantum algorithms can exploit these superpositions of states to solve various problems.

In principle any two-level quantum system can be used to define a qubit. The eigenstates of an operator Z can be, for example, a ground state $|g\rangle$ and an excited state $|e\rangle$. The ground state may be a first eigenstate of the Z operator with $Z|g\rangle = +1|g\rangle$, and the excited state may be a second eigenstate of the Z operator with $Z|e\rangle = -1|e\rangle$. However, the qubit may exist in a superposition of its eigenstates, $|\psi\rangle = \alpha|g\rangle + \beta|e\rangle$, for some real values $\alpha$ and $\beta$ such that $|\alpha|2+|B|^2=1$. A measurement of the qubit in the Z basis will project the qubit onto either the ground state or the excited state with a probability dependent on the parameters $\alpha$ and $\beta$. A state projection may be intentionally caused by a measurement, or may be unintentionally caused as a result of the qubit's interaction with the environment. A major obstacle to the development of quantum computers is decoherence-unintended interactions of a quantum state with the external world lead to a loss of quantum information.

Advances in quantum computing have now developed to the point at which "quantum supremacy" has been achieved, ushering in the era of noisy, intermediate-scale quantum (NISQ) hardware, which can no longer be simulated effectively classically, even on the world's largest supercomputers. However, this "supremacy-class" hardware is still extremely limited in terms of the number of qubits that can be controlled and the decoherence time—the time after which the fidelity of the qubits has degraded to the extent that the results of a performed algorithm are effectively meaningless. Currently quantum computing architectures have on the order of ≈50 qubits, and are only capable of implementing quantum circuits up to depth of order ≈20 before decoherence renders the results meaningless. To implement algorithms that require a larger circuit depth one requires error correction or fault-tolerant quantum computation, by which many physical qubits may be joined together to form a single logical qubit with a much lower effective error rate, and longer decoherence time. However, fully scalable, fault-tolerant quantum computers are beyond the reach of current and likely near-term NISQ hardware.

The present disclosure seeks to mitigate some of the problems with implementing quantum algorithms on NISQ hardware described above.

SUMMARY

In the most commonly used framework for designing quantum algorithms, an algorithm is mapped onto a quantum circuit—a sequence of quantum logic gates (for example, the controlled-NOT gate) applied to a register of qubits to perform (quantum) logic operations in order to implement the algorithm. Quantum logic gates and circuits provide a highly convenient abstraction of quantum hardware, and are the standard way to design quantum algorithms. While they sit at a significantly lower level than even assembly code in classical computing, any layer of abstraction sacrifices some overhead for the sake of convenience; the quantum circuit model itself is no exception.

In the underlying quantum hardware, quantum logic gates are implemented by controlling interactions between qubits, e.g., by changing voltages to bring superconducting qubits in and out of resonance; or by firing laser pulses to manipulate the internal states of trapped ions. By restricting to implementing a fixed set of quantum logic gates, one sacrifices the full flexibility of this quantum control in the interests of designing and running standard, circuit-model algorithms that can be translatable generally to other quantum processor architectures.

The inventors have realised that in the NISQ era, the number of qubits available is too low and the decoherence times of each qubit are too short to be able to implement most quantum algorithms before the results are rendered meaningless. In order to map quantum algorithms to such an aforementioned standard discrete gate set, one commonly needs to compile the gates appearing in the quantum algorithm down to the gate set available on the quantum device; this compilation is commonly done by the Solovay-Kitaev algorithm or similar techniques, which states that the circuit depth overhead is upper-bounded by a poly-logarithmic factor. However, when the number of possible interactions with a qubit before decoherence renders the results meaningless is small, as it is in NISQ hardware, even a constant factor improvement in the time required to perform a computation could make the difference between being able to run an algorithm on NISQ hardware, and being beyond the reach of such hardware. The inventors have realised that quantum algorithms can be re-designed "one level below" the quantum circuit model and that such re-designing of a quantum algorithm gives rise to a large constant factor improvement in the time required to perform a quantum algorithm.

In what follows the terms quantum computer and quantum information processor have been used interchangeably and are understood to mean an apparatus containing the physical units (e.g. superconducting circuits or ions or other hardware implementations) that are used to define qudits.

In what follows a qudit is defined as a unit of quantum information that is describable by a superposition of two or more mutually orthogonal quantum states. Hence a qudit can refer herein to a qubit (described by a superposition of two mutually orthogonal quantum states), a qutrit (described by a superposition of three mutually orthogonal quantum states) or any unit of quantum information describable by a superposition of more than three mutually orthogonal quantum states. Qudits are units of information (as opposed to physical units in themselves), but as qudits are defined based on underlying quantum physical units, the underlying physical units may be referred to in places as qudits (e.g. "physical qudits") in what follows.

Quantum computers come in a variety of different architectures, but what they typically have in common is the ability to generate quantum states and manipulate qudits. A multiqudit algorithm refers to any algorithm involving three or more qudits that is performable on a quantum computer. A multiqudit algorithm traditionally requires setting up an initial logical qudit state, and then implementing a set of physical operations to apply a series of quantum logic gates to the initial quantum multiqudit state. By the Solovay-Kitaev theorem, any multiqudit algorithm can be compiled to a universal set of single- and two-qudit logic gates. However, the inventors have devised a way in which to re-design a quantum algorithm at "a level below" the quantum circuit model, by considering the physical constraints posed by the underlying quantum devices.

According to an aspect of the present disclosure a method is provided. The method is suitable for determining a control sequence for performing a multiqudit algorithm on a quantum computer, the multiqudit algorithm expressible as a series of one or more k-qudit interactions. The method comprises, for each of the k-qudit interactions, decomposing the k-qudit interaction into a sequence of single-qudit unitary rotations and/or two-qudit unitary rotations from the continuous family of controllable unitary rotations generated by underlying physical interactions in the hardware of the quantum computer subject to a specified minimum interaction time, said sequence being physically implementable on the quantum computer. The method further comprises combining the sequences to form a combined interaction sequence. The method further comprises determining, based on the combined interaction sequence, the control sequence for performing the multiqudit algorithm on the quantum computer.

Following standard terminology in quantum physics, a "unitary rotation" is any operation on one or more qudits whose action on the state of the qudits is represented by a unitary matrix. As global phases are not physically relevant in quantum mechanics, all unitary transformations of states are commonly referred to as "rotations", even if they are not elements of the rotation subgroup of the unitary group.

Following standard terminology in quantum computation, an "algorithm" is a quantum operation that can be described by a series or sequence of at least two one- or two-qudit gates in the quantum circuit model. A "multiqudit algorithm" is an algorithm involving at least 3 qudits and at least two gates.

As explained above, a limitation of performing any algorithm designed as a quantum logic circuit on a quantum computer is that the multiqudit state repeatedly interacts with the environment, which introduces noise and errors; after a limited amount of time the qudit state is completely decohered, rendering it useless for use in a quantum algorithm without applying error-correction and fault-tolerance techniques, which are extremely costly in terms of resources (number of additional qudits and gates required). Any measurement of the qudit state made after it is completely decohered will not return useful information. The period of time that the qudit state remains stable is called the decoherence time, and places a limit on how many operations can be performed by the quantum computer, and therefore also places a limit on the length and complexity of a quantum algorithm performable on the quantum computer. For today's and near-future NISQ hardware, the decoherence time is a major limitation and puts many quantum algorithms far beyond the reach of NISQ hardware.

A k-qudit interaction is an interaction between k physical qudits, where k is an integer, represented by a Hamiltonian. The multiqudit algorithm may be expressed as a series or sequence of k-qudit interactions, where a series means at least two, and the values of k and the degree of the qudit in the series do not all have to be the same, but can differ from each other. For example, the series of one or more k-qudit interactions may comprise a 4-qubit interaction, followed by a 1-qubit interaction, followed by a 3-qubit interaction, and so on. While many of the examples described herein relate to qubits, the methods described herein are readily applicable to quantum computers that use qutrits or other higher dimensional qudits. More specifically, a k-qudit interaction may correspond to a tensor. This tensor may be decomposed as a sum over r different tensor products of operators $\Sigma_r O_1 \otimes O_2 \otimes \ldots \otimes O_n$ On where $O_j$ is an operator acting on the $j^{th}$ physical qudit. In this case, the tensor is said to have tensor-rank r. A tensor product of n operators is also referred to as a "string" of length n. It is said to have a weight k if k of the operators $O_1, O_2, \ldots, O_n$ are not equal to the identity matrix $\mathbb{1}$, i.e., it contains n-k identity matrices. Decomposing a k-qudit interaction into an interaction sequence consisting of single qudit rotations and/or two-qudit interactions may accordingly comprise decomposing the k-qudit interaction into a sequence of interactions, each corresponding to a string of length n and weight 2 or 1 and constrained by the physical characteristics of the quantum computer. For example, in quantum computing architectures that are constrained such that the only two-qubit interactions that are possible are between nearest neighbours then the strings may take the form $\mathbb{1} \otimes \mathbb{1} \otimes \ldots \otimes O_l \otimes \ldots \otimes O_m \otimes \ldots \otimes \mathbb{1}$ where the $l^{th}$ and $m^{th}$ and physical qudits are neighbours.

Advantageously, by expressing a multiqudit algorithm as a series of k-qudit interactions and decomposing each k-qudit interaction into a sequence consisting of single-qudit unitary rotations and/or two-qudit unitary rotations physically implementable on the quantum computer, the multiqudit algorithm is effectively implemented "one level below" the quantum circuit model and in some cases takes much less time to perform than a sequence of quantum logic gates that could conceivably arrive at the same processing outcome. A unitary rotation/interaction is understood to be physically implementable on a quantum computer if it takes into account the physical constraints of the quantum computer. For example, in some quantum information processor architectures, such as that demonstrated in FIG. 7a, the physical qudits are arranged in a lattice and only single qubit interactions and two-qubit interactions between nearest neighbours are physically possible—in this context a unitary rotation may be considered to be physically implementable on the quantum computer if it is between nearest neighbours, but is not considered to be physically implementable if it is not between nearest neighbours (although an interaction between separated qudits may be broken down/decomposed into a sequence of nearest-neighbour interactions which are physically implementable). In other quantum computer architectures (for example, in ion trap quantum computers), such a physical constraint may not exist—interactions may be performed between physical qudits that are not nearest neighbours.

Each of the k-qudit interactions is thus broken down into a sequence consisting of single-qudit unitary rotations and/or two-qudit unitary rotations physically implementable on the quantum computer. The interaction sequence decompositions of the series of k-qudit interactions are then combined or concatenated to form a combined interaction sequence. The combined interaction sequence thus consists of a set of one and/or two-qubit unitary rotations which, if applied to a qudit state of the quantum computer, would apply the multiqudit algorithm to that qudit state.

A control sequence is determined based on the combined interaction sequence. The control sequence may take any suitable form. For example, the control sequence may comprise a set of computer-readable instructions which, when executed by a processor, cause some interaction means to interact with the quantum computer in order to cause the quantum computer to implement the multiqudit algorithm. For example, the control sequence may contain instructions pertaining to the ordering, characteristics and duration of a sequence of laser pulses, or to the control lines along which voltages must be applied and for how long. The control sequence may be provided as high-level implementation code or as machine code, for example.

By determining a control sequence according to a method as described herein, multiqudit algorithms may be performed more quickly and more precisely. This also means that longer and more complex multiqudit algorithms can be performed before the decoherence time of the qudit expires. Thus, the methods described herein enable more complex multiqudit algorithms to be performed accurately on NISQ quantum hardware, where qudit numbers and decoherence time provide constraints.

The method of determining a control sequence may further comprise a step of expressing the multiqudit algorithm as the series of k-qudit interactions before decomposing each of the k-qudit interactions. Expressing the multiqudit algorithm as a series of k-qudit interactions may, for example, comprise trotterising a Hamiltonian or other generator of the algorithm as will be explained further below.

The at least one k-qudit interactions may comprise a 3-qudit interaction. The at least one k-qudit interactions may comprise a 4-qudit interaction.

A qudit may comprise a qubit. The multiqudit algorithm may accordingly be a multiqubit algorithm expressible as a series of one or more k-qubit interactions. This allows preferably for multiqubit algorithms to be performed on quantum computers that generate and manipulate qubits.

The k-qudit interactions may comprise operations that correspond to a tensor product of Pauli-type interactions. That is, a k-qudit interaction may be derived from a coupling formed as a tensor product of the Pauli operators $\sigma^x$, $\sigma^y$, $\sigma^z$ and the identity operator $\mathbb{1}$, for example, $\sigma^x \otimes \sigma^z \otimes \mathbb{1} \otimes \ldots \otimes \sigma^z$ or $\mathbb{1} \otimes \sigma^x \otimes \sigma^z \otimes \ldots \otimes \sigma^x$. More specifically, a k-qubit interaction may comprise a n-length Pauli string of weight k. An n-length Pauli string is a tensor product of finitely many Pauli matrices and identity matrices (denoted $\mathbb{1}$) where the number of matrices involved in the tensor product is n. The weight of an n-length Pauli string is the number of non-identity Pauli matrices in the n-length string. The integer n therefore represents the number of qubits to which the k-qubit interaction is applied (the application of the identity matrix $\mathbb{1}$ to a qubit is understood to mean no interaction with that qubit-that is, the state of the qubit is the same before and after the application of $\mathbb{1}$). Decomposing a k-qudit interaction may comprise comparing the k-qudit interaction to a parametrised interaction sequence. In examples, an ansatz solution may be used to define a decomposition for a k-qudit interaction. Advantageously the decomposition step can be simplified by enabling the use of a look-up table and adjusting parameters to determine the right series of interactions to use, rather than needing to determine or verify from first principles the series of one and/or two qudit interactions.

The multiqudit algorithm may comprise a simulation of the time dynamics of a Hamiltonian as applied to an initial quantum state. The advantages of designing quantum algorithms "one level below" the circuit model are particularly acute in the case of Hamiltonian time-dynamics simulations. The simulation of the time evolution of a quantum state $|\psi\rangle$ under Hamiltonian H according to Schrodinger's equation (with $\hbar=1$) is given by $$i\frac{\partial}{\partial t}|\psi\rangle = H|\psi\rangle \tag{1}$$

where t is a parameter representing time. If the time evolution operator $$U(t) = \exp(-iHt) \tag{2}$$

can be efficiently simulated then the eigenvalues of H can be obtained efficiently through e.g. a phase estimation algorithm. To simulate evolution under a many-body Hamiltonian $H = \Sigma_{<i,j>} h_{ij}$ up to a fixed time T, the basic Trotterization method repeatedly time-evolves the system under each individual interaction $h_{ij}$ for a small time step $\delta$:

$$e^{-iHT} \approx \prod_{n=0}^{T/\delta}\left(\prod_{\langle i,j\rangle} e^{-ih_{ij}\delta}\right). \tag{3}$$

To achieve good precision, $\delta$ must be small. In the circuit model, each $e^{-ih_{ij}\delta}$ Trotter step necessarily requires at least one quantum gate to implement. Thus the required circuit depth—hence the required run-time—is at least $T/\delta$. In contrast, if one is able to implement $e^{-ih_{ij}\delta}$ directly in time d, then the total run time would be T, which improves on the circuit model algorithm by a factor of $1/\delta$. This is "only" a constant factor improvement, in line with the Solovay-Kitaev theorem. But this "constant" can be very large; indeed, it diverges as the precision of the algorithm increases.

It is unrealistic to assume the hardware can implement $e^{-ih_{ij}\delta}$ for any desired interaction $h_{ij}$ and any time $\delta$. Furthermore, the interactions are typically limited to at most a handful of specific types, determined by the underlying physics of the device. And these interactions cannot be switched on and off arbitrarily fast, placing a limit on the smallest achievable value of $\delta$. But this simplified overview indicates why there are large gains to be had by designing algorithms to exploit the full hardware capabilities, rather than restricting to standard gate sets and circuits.

Even if implementing each Trotter step $e^{-ih_{ij}\delta}$ incurred polynomial overhead $$\sqrt[s]{\delta}$$

tor $s>1$ (since $\delta \ll 1$, polynomial overhead means taking roots, not powers), then the total run time would be $T\delta^{1/s-1}$, which improves on the circuit model algorithm by a factor of $$1/\sqrt[s]{\delta}.$$

The more sophisticated techniques described herein enable users to realise the types of gains discussed above, even when one is restricted to the more realistic model of NISQ hardware.

As well as potential gains in efficiency, designing algorithms "one level below" the circuit model can also in some cases reduce the impact of errors and noise during the algorithm. Again, this benefit is particularly acute in Hamiltonian simulation algorithms. If an error occurs on a qubit in a quantum logic circuit, a two-qubit gate acting on the faulty qubit can spread the error to a second qubit. In the absence of any error-correction or fault-tolerance (both of which are challenging on NISQ devices), errors spread to an additional qubit with each gate applied, so that after circuit depth n the error can spread to all n qubits. In the circuit model, each $e^{-ih_{ij}\delta}$ Trotter step requires at least one two-qubit gate, so a single error can be spread throughout the system in time as short as $\delta n$. However, if the time-evolution $e^{-ih_{ij}\delta}$ under a two-qubit interaction $h_{ij}$ is implemented directly, one would intuitively expect it to only "spread the error" by a small amount $\delta$ under each such time-step. Thus one can expect it to take time $O(n/\delta)$ before the error can propagate to all n qubits—a factor of $1/\delta^2$ improvement. Another way of viewing this is that, in the circuit model, the Lieb-Robinson velocity is always $O(1)$, regardless of what unitary dynamics is being implemented by the overall circuit. In contrast, the Trotterized Hamiltonian evolution has Lieb-Robinson velocity $O(1/\delta)$.

The method of determining the control sequence may further comprise, after the combining step, repeating the combined interaction sequence at least once to form a repeated interaction sequence, and wherein determining the control sequence based on the combined interaction sequence comprises determining the control sequence based on the repeated sequence. This enables, for example, for the determination of a control sequence to exploit the properties of Trotterization—breaking down a multiqudit algorithm into repeating units—and thus allow an efficient and effective determination of a control sequence for performing certain multiqudit algorithms. If, for example, a user is attempting to simulate the time dynamics of a Hamiltonian as applied to a state for time T then Trotterisation may be used to break down the operation into T $\delta$ steps each applied for a time d. An individual Trotter step may be converted into a combined interaction sequence comprising a series of single-qubit unitary rotations and two-qubit unitary rotations physically implementable on a quantum computer, and then that combined interaction sequence may be repeated T/$\delta$ times.

The quantum computer may be any suitable type of quantum computer. For example, the quantum computer may be a superconducting quantum computer or an ion trap quantum computer. This allows for the decomposition and determination of the control sequence to be specifically adapted to match the architecture of the superconducting quantum computer or ion trap quantum computer, so that the same multiqudit algorithm can be effectively and efficiently performed on the superconducting quantum computer or the ion trap quantum computer.

According to another aspect of the present disclosure a computer-readable medium is described. The computer-readable medium has instructions stored thereon which, when read by a processor, cause the processor to execute any of the above methods for determining a control sequence for performing a multiqudit algorithm on a quantum computer.

According to another aspect of the present disclosure, computing apparatus is described herein. The computing apparatus comprises one or more processors. The computing apparatus further comprises one or more memories having instructions stored therein which, when executed by the one or more processors, cause the one or more processors to execute any of the described methods for determining a control sequence for performing a multiqudit algorithm on a quantum computer.

According to another aspect of the present disclosure, a method is described for performing a multiqudit algorithm on a quantum computer. The method comprises executing a control sequence determined according to any of the described methods for determining a control sequence for performing a multiqudit algorithm on a quantum computer.

According to another aspect of the present disclosure, a computer-readable medium has instructions stored thereon which, when read by a processor of a computing device, cause the computing device to execute a control sequence determined according to a method as described herein for determining a control sequence for performing a multiqudit algorithm on a quantum computer.

According to another aspect of the present disclosure, computing apparatus is described. The computing apparatus comprises an interaction module/interaction means for interacting with qudits of a quantum computer. The computing apparatus further comprises a controller configured to receive a control sequence determined according to any of the described methods for determining a control sequence for performing a multiqudit algorithm on the quantum computer. The controller is further configured to control the interaction module/interaction means according to the control sequence in order to perform the multiqudit algorithm on the quantum computer.

A computer program and/or the code/instructions for performing such methods as described herein may be provided to an apparatus, such as a computer, on a computer readable medium or computer program product. The computer readable medium could be, for example, an electronic, magnetic, optical, electromagnetic, infrared, or semiconductor system, or a propagation medium for data transmission, for example, for downloading the code over the Internet. Alternatively, the computer readable medium could take the form of a physical computer readable medium such as semiconductor or solid-state memory, magnetic tape, a removable computer diskette, a random access memory (RAM), a read-only memory (ROM), a rigid magnetic disc, and an optical disk, such as a CD-ROM, CD-R/W or DVD.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Embodiments of the invention will now be described by way of example only, with reference to the accompanying figures in which:

FIG. 3 shows a flow chart of a method of determining a control sequence for performing a multiqudit algorithm;

FIG. 8*c* illustrates an example decomposition which may be carried out on non-neighbouring qubits in the architecture of FIG. 8*a;* and FIG. 9 shows a table of decompositions of interactions that generate time-evolutions of the form exp (iT $(\sigma^z \otimes \sigma^z \otimes \sigma^z)$))

Throughout the description and the drawings, like reference numerals refer to like parts.

DETAILED DESCRIPTION OF THE INVENTION

The present invention seeks to provide novel/improved methods for determining an identifier value of a device, and appropriate apparatuses and devices for performing said methods. Whilst various embodiments are described below, the invention is not limited to these embodiments, and variations of these embodiments may well fall within the scope of the invention which is to be limited only by the appended claims.

Figure 1:
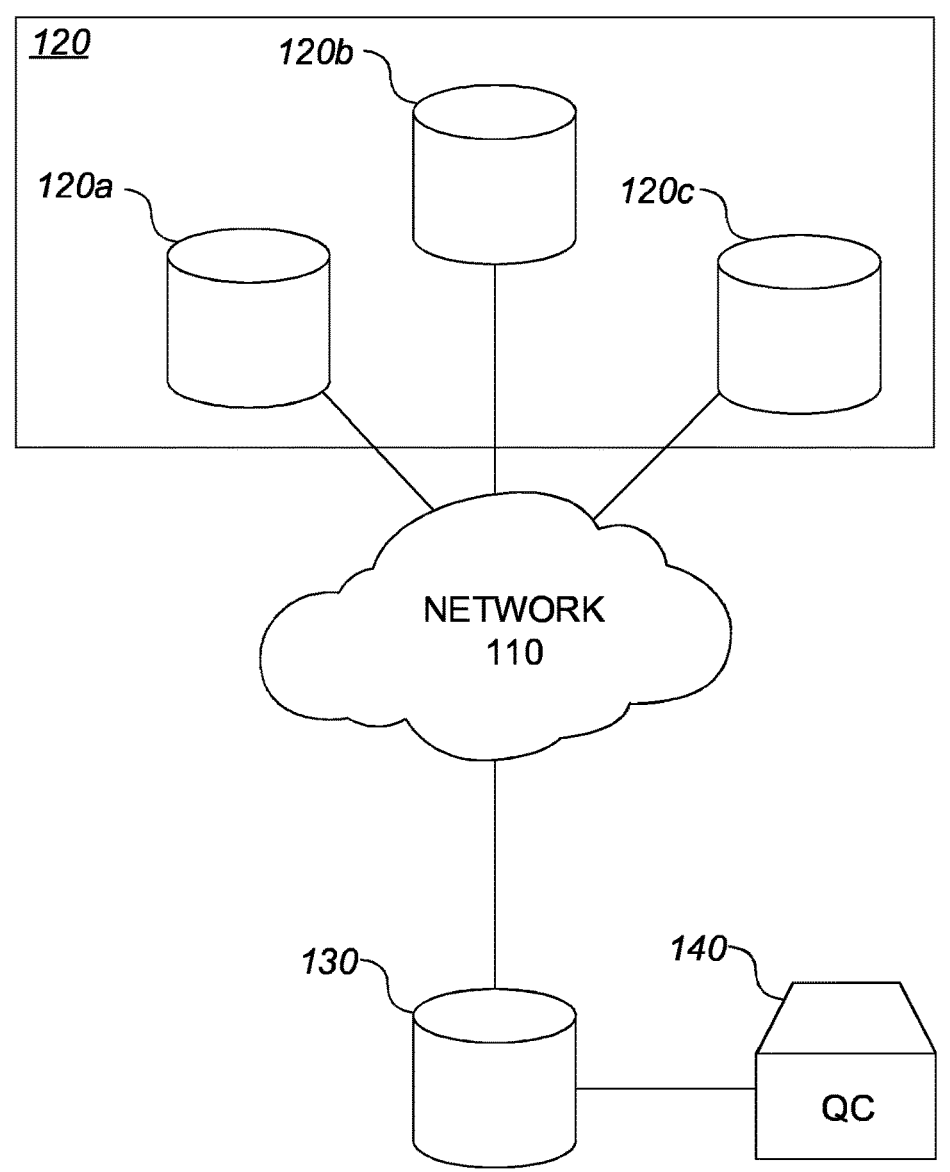
FIG. 1 illustrates a communication system including a quantum computer.

FIG. 1 shows a computer system 100 in accordance with the present disclosure. The computer system 100 comprises one or more computing apparatuses 120, a network 110, a controller apparatus 130 and a quantum computer 140.

The one or more computer apparatuses 120, such as computer apparatus 120*a*, 120*b* or 120*c*, and the controller apparatus 130 can communicate with each other over the network 110. The network 110 may be any known type of computer network, enabling wired or wireless communication between computer apparatuses 120 and the controller apparatus 130, and could, for example, be a Local Area Network (LAN), a Wide Area Network (WAN), or the Internet.

At least one of the computer apparatuses 120 are able to generate or store locally, or receive and transmit over the network 110, a whole or part of a control sequence for performing qudit operations on the quantum computer 140.

The controller apparatus 130 is able to generate or receive from one of the computers 120 a control sequence for performing operations on the quantum computer 140. The controller apparatus 130 is able to interact directly with the quantum computer 140 according to a control sequence.

The quantum computer 140 can be any device which is able to generate and manipulate quantum states. The quantum computer 140 may have any type of architecture, and may generate quantum states using any known method, including, but not limited to the following methods; nuclear magnetic resonance, ion traps, superconductors, quantum dots, electrons on liquid helium, solid-state spin spectroscopy, and cavity QED. The quantum computer 140 may be any quantum computer that uses qubits or qutrits, or may be a quantum computer that uses higher order qudits. The quantum computer 140 may generate and manipulate qudits according to a control sequence applied by the controller apparatus 130.

The skilled person would appreciate that other set-ups to that shown in FIG. 1 may be suitable. For example, the controller apparatus 130 and the quantum computer 140 may be combined in one unit. The computing apparatus 120 may not be necessary—for example, the controller apparatus 130 may itself perform methods for determining a control sequence as well as applying the control sequence to the quantum computer 140.

Figure 2A:
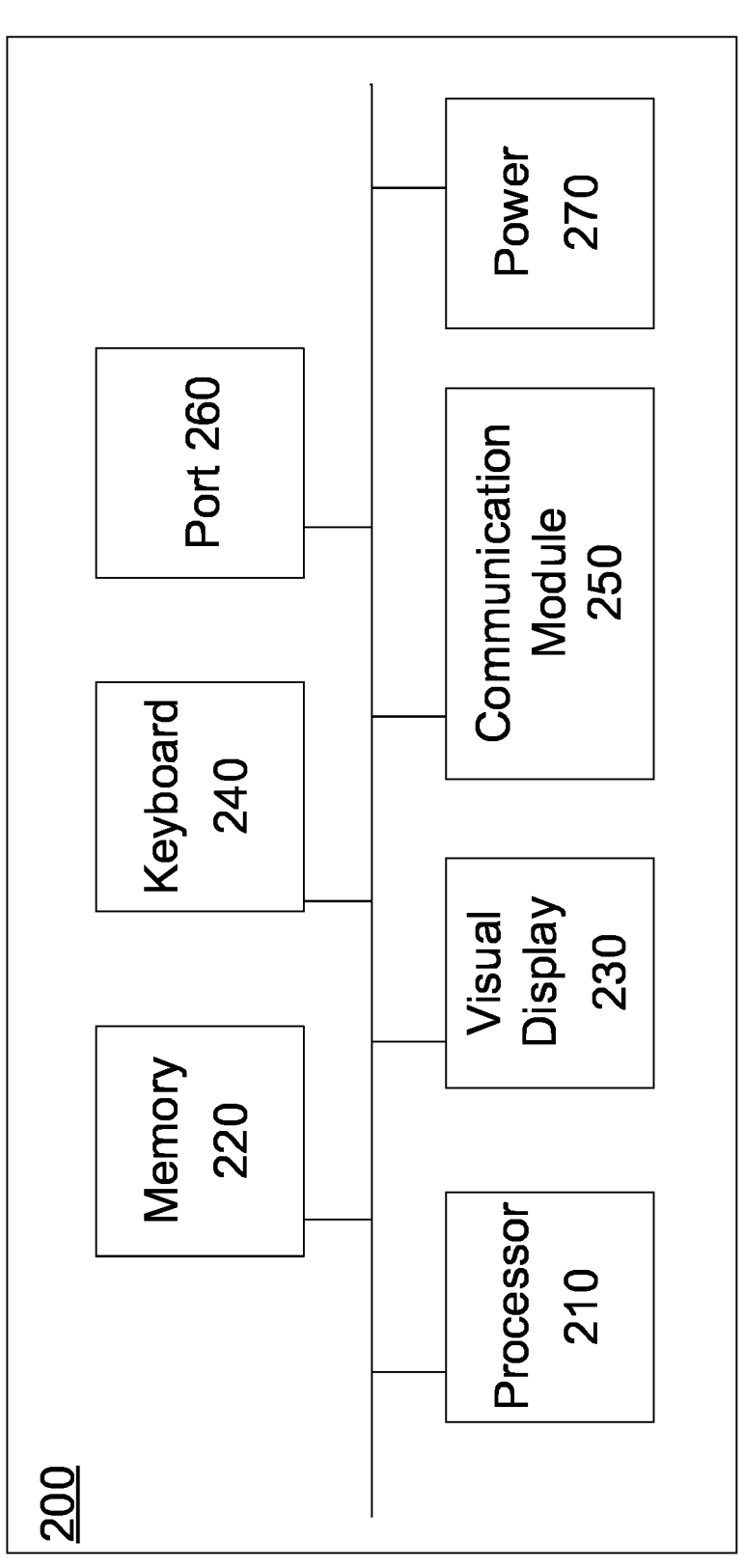
FIG. 2a shows a schematic of a computing apparatus.

FIG. 2*a* is a block diagram of a computing apparatus 200. For example, computing apparatus 200 may comprise a computing device, a server, a mobile or portable computer and so on. Computing apparatus 200 may be distributed across multiple connected devices. Computing apparatus 200 may be suitable for use as computer apparatus 120 of FIG. 1. Other architectures to that shown in FIG. 2*a* may be used as will be appreciated by the skilled person.

Referring to the figure, computing apparatus 200 includes one or more processors 210, one or more memories 220, a number of optional user interfaces such as visual display 230 and virtual or physical keyboard 240, a communications module 250, optionally a port 260, and optionally a power source 270. Each of components 210, 220, 230, 240, 250, 260, and 270 are interconnected using various busses. Processor 210 can process instructions for execution within the computing apparatus 200, including instructions stored in memory 220, received via communications module 250, or via port 260.

Memory 220 is for storing data within computing apparatus 200. The one or more memories 220 may include a volatile memory unit or units. The one or more memories may include a non-volatile memory unit or units. The one or more memories 220 may also be another form of computer-readable medium, such as a magnetic or optical disk. One or more memories 220 may provide mass storage for the computing apparatus 200. Instructions for performing a method as described herein may be stored within the one or more memories 220. For example, the memory 220 may contain instructions for determining a control sequence, or may store the control sequence, or a part thereof, generated by such a method.

The apparatus 200 includes a number of user interfaces including visualising means such as a visual display 230 and a virtual or dedicated user input device such as keyboard 240.

The communications module 250 is suitable for sending and receiving communications between processor 210 and remote systems. For example, communications module 250 may be used to send and receive communications via a communication network 110 such as the Internet.

The port 260 is suitable for receiving, for example, a non-transitory computer readable medium containing instructions to be processed by the processor 210.

The processor 210 is configured to receive data, access the memory 220, and to act upon instructions received either from said memory 220 or a computer-readable storage medium connected to port 260, from communications module 250 or from user input device 240.

Figure 2B:
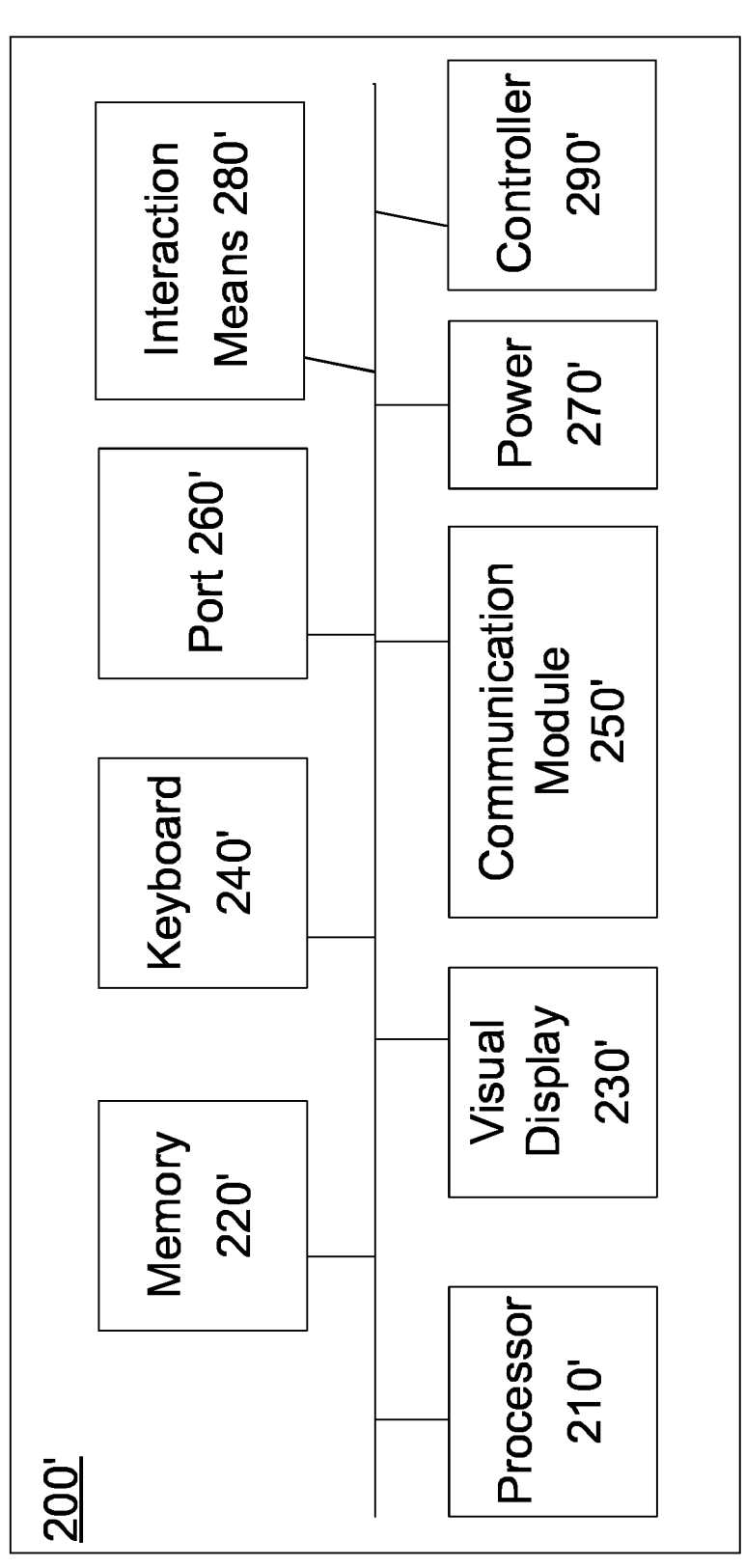
FIG. 2b shows a schematic of a computing apparatus suitable for use as a controller.

FIG. 2b shows an example of a second computing apparatus 200', which may be suitable for use as controller computer 130 of FIG. 1. The computing apparatus 200' of FIG. 2b is shown having similar components 210', 220', 230', 240', 250', 260', 270' to those of the computing apparatus 200 of FIG. 2a. The computing apparatus 200' further comprises an interaction module/interaction means 280' and controller 290'. The skilled person would appreciate that different architectures would be suitable. For example, the interaction means 280' may be external to the controller apparatus 200'.

The interaction module/interaction means 280' is suitable for interacting with a quantum information processor/quantum computer 140. The interaction means may be used to generate an initial quantum state on the quantum computer 140, and may be used to manipulate the qudits of the quantum information processor/quantum computer. The interaction means may be used to read out a state of the quantum computer 140. The form and characteristics of the interaction means depends on the type of quantum computer 140 being used to process quantum information, and examples of quantum computers are described below. For example, if the quantum computer 140 comprises an ion trap quantum computer then the interaction means 280' may comprise one or more lasers for preparing an initial quantum state via, e.g., optical pumping, and may comprise apparatus for manipulating magnetic dipole transitions or stimulated Raman transitions or apparatus for manipulating electric quadrupole transitions, in order to manipulate the quantum state. For example, if the quantum computer comprises a superconducting quantum computer then the interaction means 280' may comprise circuitry to apply a voltage across a particular point in the superconducting circuit or apparatus for coordinating microwave pulses applied to the superconducting quantum computer. The quantum computer 140 may comprise any type of quantum computer and the corresponding interaction means 280' may comprise any means suitable for interaction with the qudits of the quantum computer 140.

The controller 290' is configured to control the interaction means 280' according to a control sequence. The controller computer 130 may determine the control sequence locally according to any method of determining a control sequence described herein, or may receive the control sequence from an external computer apparatus 120, or via a computer-readable medium with the control sequence stored thereon being connected with the port 260'.

According to an example, a user of computer apparatus 120 may seek to perform a multiqudit algorithm on quantum computer 140. The computer apparatus 120 may determine a control sequence for performance on a quantum information processor/quantum computer 140. The computer apparatus 140 may communicate via network 110 to control apparatus 130 which may then control the implementation of the control sequence on the quantum computer 140. The results may then be communicated back to the computer apparatus 120 for provision to the user. Of course, the skilled person would appreciate that the computer apparatus 120 is not necessary—for example, the user may interact directly with the control apparatus 130.

As explained above, a multiqudit algorithm would traditionally be designed as a sequence of quantum logic gates under the quantum circuit model. In contrast, in the present disclosure the algorithm is effectively re-designed "one level below" the quantum circuit model, taking into consideration the physical constraints of the hardware to improve runtime implementation.

FIG. 3 shows a flowchart which outlines a method of determining a control sequence for performing a multiqudit algorithm on a quantum computer. The method may be performed by any suitable computing apparatus, for example, the computer apparatus 120 or the controller apparatus 130 of FIG. 1 and the computer apparatuses 200 and 200' of FIG. 2a and FIG. 2b respectively. The multiqudit algorithm is expressed as a series of k-qudit interactions.

At step 302, each k-qudit interaction of the multiqubit algorithm is decomposed into a sequence consisting of single-qudit unitary rotations and/or two-qudit unitary rotations from the continuous family of controllable unitary rotations generated by underlying physical interactions in the hardware of the quantum computer subject to a specified minimum interaction time, said sequence being physically implementable on the quantum computer. The one and/or two unitary rotations of the interaction sequence are qudit interactions which can be performed directly and in real time and are thus described at one level of abstraction below that of the quantum logic gate. This means the interaction sequence can be performed much more quickly and precisely than by using quantum logic gates.

The available choices of single-qudit unitary rotations and/or two-qudit unitary rotations to decompose each k-qudit interaction may be derived by use of a mathematical ansatz and selected on a case by case basis.

At step 304, the sequences resulting from the decomposition of each k-qudit interaction in step 302, are combined to form a combined interaction sequence. Thus, an initial multiqudit algorithm expressible as a series of k-qudit interactions is now expressed by a single combined interaction sequence consisting of single-qudit unitary rotations and/or two-qudit unitary rotations which are directly physically implementable on a quantum computer.

At step 306, the combined interaction sequence is used to determine, i.e., generate, the control sequence for performing the multiqudit algorithm on the quantum computer 140. If the whole control sequence is applied to the quantum computer 140 by the controller apparatus 130, this will cause the multiqudit algorithm to be carried out by the quantum computer 140. The determined control sequence, or any part of it, may be applied to the quantum computer 140 as soon as it is determined, or else it may be subsequently stored.

The steps of FIG. 3 will now be demonstrated by way of example. The particular examples described below involve qubits, i.e., multiqubit algorithms expressible as a series of k-qubit interactions, which are decomposed into 1-qubit unitary rotations and/or 2-qubit unitary rotations. However, the principles and teachings used in the qubit examples below can be similarly applied to multiqudit algorithms and k-qudit interactions involving higher order qudits, e.g., multiqutrit algorithms expressible as a series of k-qutrit interactions, which are decomposed into 1-qutrit rotations and/or 2-qutrit rotations.

The following examples set out below involve the decomposition of k-qubit interactions which are, or form part of, a multiqubit algorithm U-exp (iTH), which is a simulation of a many-body Hamiltonian H for fixed time T. An example of a Hamiltonian which may be treated in this way is the Fermi-Hubbard Hamiltonian.

In some cases the multiqubit algorithm U-exp (iTH) can be decomposed directly as a k-qubit interaction according to step 302 of FIG. 3. In other cases, the number of qubits which H operates on may be too big and/or the time T of the simulation too long for U to be decomposed directly according to the decomposition methods disclosed. In this case, U may be first approximately decomposed using the known method of Trotterisation.

Assuming that the Hamiltonian H breaks up into M mutually non-commuting layers $$H = \sum_{i=1}^{M} H_i,$$

i.e. such that $[H_i, H_j] \neq 0 \, \forall i \neq j$, Trotterizing means making the approximation $$\mathcal{E}(T) := e^{-iHT} = \prod_{n=1}^{T/\delta} \prod_{i=1}^{M} e^{-iH_i\delta} + \mathcal{R}_1(T, \delta) = \mathcal{P}_1(\delta)^{T/\delta} + \mathcal{R}_1(T, \delta). \tag{4}$$

Here $\mathcal{R}_1(T, \delta)$ denotes the error term remaining from this approximate decomposition, and it is defined as $\mathcal{R}_1(T,\delta) = \mathcal{E}(T) - \mathcal{P}_1(\delta)^{T/\delta}$. The outer product of the Trotterization is known as a Trotter step, and is repeated T ò times, thus approximating U over the total time T by performing U over a smaller time increment ò. The inner product for each Trotter step is one of the M non-commuting layers which describe individual interaction terms from the Hamiltonian H.

Each of the M layers is an example of k-qubit interactions which can be decomposed according to step 302 of FIG. 3, into an interaction sequence consisting of single-qubit unitary rotations and/or two qubit rotations. The derived M interaction sequences may then be combined to form a single combined interaction sequence, as per step 304 of FIG. 3.

Equation (4) is an example of a first-order product formula, and it is derived from the Baker-Campbell-Hausdorff identity $$e^{A+B} = e^A e^B e^{[A,B]/2} \ldots, \text{ and } e^{A+B} = e^{(\delta A + \delta B)/\delta} = [e^{\delta A + \delta B}]^{1/\delta}.$$

Choosing δ small in Equation (4) means that corrections for every factor in this formula come in at $O(\delta^2)$ (i.e. in the form of a commutator), and since one has to perform $1/\delta$ many rounds of the sequence $e^{\delta A} e^{\delta B}$ the overall error scales roughly as $O(\delta)$.

The skilled person would appreciate that the decomposition shown in Equation (4) is a first-order product formula and that higher order decompositions are also possible.

Expressing a multiqubit algorithm U=exp (iTH) as a series of k-qubit interactions may comprise trotterizing the multiqubit algorithm by identifying the M mutually non-commuting elements $H_i$ of the Hamiltonian H, and then further expressing each of those M mutually non-commuting elements $H_i$ of the Hamiltonian H as a series of k-qubit couplings $H_i = h_{i,k1} + h_{i,k2} + h_{i,k3} \ldots$ (e.g. a k-qubit interaction generates a time-evolution of the form exp $[i\delta_{kx} h_{i,kx}]$, where $\delta_{kx}$ is a time unit for applying the interaction $h_{i,kx}$), each k-qubit coupling comprising a Pauli string of length n (e.g. $h_{i,kx} = \sigma^x \otimes \sigma^z \otimes \mathbb{1} \otimes \ldots \otimes \sigma^z$) to the qubits of the quantum computer, wherein the n-length Pauli string has a Pauli weight of k (kx in the example). In this example, the number of physical qubits in the quantum computer is considered to be n.

The skilled person would of course appreciate that there are other ways of expressing the multiqubit Hamiltonian as a series of k-qubit interactions. For example, each of the M mutually non-commuting elements $H_i$ of the Hamiltonian H may comprise a single Pauli string (e.g. $H_j = \sigma^x \otimes \sigma^z \otimes \mathbb{1} \otimes \ldots \otimes \sigma^z$).

For the sake of keeping notation as simple as possible, the notation $U(\delta) = \exp(i\delta h)$ is used to denote a k-qubit interaction with h a k-local Hamiltonian/coupling applied for a time δ. It shall be understood that the time-evolution U generated by such an interaction may be just one of a series of multiple Us that form part of a larger multiqubit algorithm (which may in the case of a simulation of the time dynamics of Hamiltonian H be represented by exp (iTH)), for example, U may be one of the M layers shown in the Trotterization Equation (4) above.

For the time-evolution $U(\delta) = \exp (i\delta h)$ generated by a k-qudit interaction, where h is a k-local Hamiltonian term, the goal of decomposing the k-qudit interaction is to find a decomposition:

$$U(\delta) = U_1(t_1) U_2(t_2) \ldots U_m(t_m) \tag{5}$$

where $U_j(t_j)$ amounts to a single-qubit unitary rotation or a two-qubit unitary rotation physically implementable on the quantum computer of interest for all j=1, 2, . . . , m such that the time cost $$\mathcal{T}_{cost}(U(\delta)) = \sum_{i=1}^{m} |t_i| \tag{6}$$

is minimal.

Figure 4A:
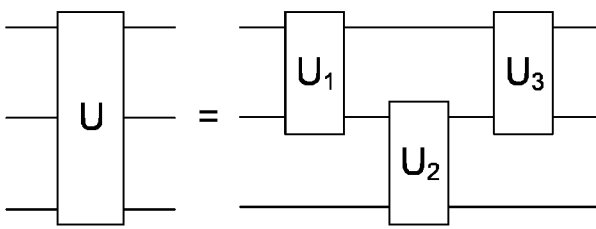
FIG. 4*a* and FIG. 4*b* illustrate respectively a 3-step decomposition and a 4-step decomposition of a 3-qubit interaction.
Figure 4B:
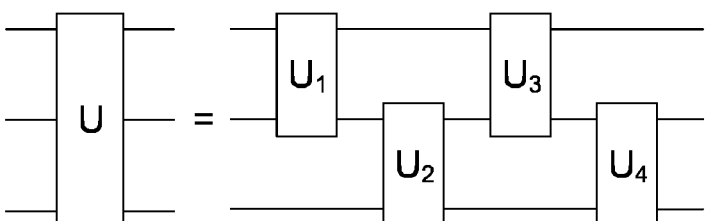

FIG. 4a and FIG. 4b each illustrate a way of decomposing a 3-qubit interaction, in accordance with the decomposing step 302 from FIG. 3. In each of FIG. 4a and FIG. 4b, each horizontal line represents a physical qubit. The top line represents a first qubit, the middle line represents a second qubit and the bottom line represents a third qubit.

In FIG. 4a, U is decomposed into three two-qubit interactions $U_1$, $U_2$ and $U_3$, which are physically implementable by a quantum computer. Specifically, the 3-qubit interaction is decomposed into a first interaction between the first qubit and the second qubit, a second interaction between the second qubit and the third qubit, and a third interaction between the first qubit and the 15 second qubit.

In FIG. 4b, the same 3-qubit interaction U is decomposed into four different two-qubit interactions $U_1$, $U_2$ and $U_3$ and $U_4$, which are also directly physically implementable by a quantum computer. Specifically, the 3-qubit interaction is decomposed into a first interaction between the first qubit and the second qubit, a second interaction between the second qubit and the third qubit, a third interaction between the first qubit and the second qubit, and a fourth interaction between the second qubit and the third qubit.

The number of single-qubit unitary rotations and/or two qubit unitary rotations into which U is decomposed, also referred to herein as the decomposition depth, is preferably chosen to optimise the trade off between the error in the decomposition and the total time taken to perform the decomposed interactions. For example, for a given k-qubit interaction, such as U, increasing the decomposition depth may decrease the overall time taken for the quantum computer to perform the exactly decomposed U, but may also decrease the likely overall precision with which the quantum computer performs all the decomposed interactions due to more compounding of errors. Furthermore, the decomposition is constrained by the physical parameters of the quantum computer itself—for example, in quantum computer architectures in which the physical qubits are arranged in a lattice and only nearest-neighbour interactions are available, then the choice of decomposition is made accordingly.

FIG. 9 shows a table of exact decompositions of a 3-qubit and a generalised k-qubit interaction, where the interaction is a time evolution of a Hamiltonian coupling h composed of a product of Pauli-Z operations. The specific 3-qubit interaction is shown decomposed into three, four and five two-qubit interactions that can be implemented directly by a quantum computer. The generalised k-qubit interaction is decomposed into three, four or five lower-weight/-qubit interactions (where l<k), which may in turn be decomposed further until an interaction sequence of single qubit rotations and two-qubit interactions is determined.

The first column of the table of FIG. 9, "coupling h", describes the coupling between qubits (i.e the localised Hamiltonian, h), that defines the interaction U=exp(iδh) that is decomposed. The first three rows describe a coupling that is the tensor product of three Pauli-Z rotations. That is, the coupling h is a Pauli string of length 3 and weight 3. The second three rows describe a coupling that is the tensor product of k Pauli-Z rotations.

These particular interactions are chosen as an example, and it would be understood by the skilled person that the teachings in FIG. 9 could be applied to other k-qubit interactions, e.g., interactions involving couplings that are the tensor product of various combinations of Pauli-X, Pauli-Y, and Pauli-Z rotations. The Pauli matrices are equivalent up to a Pauli rotation, and so one can replace a Pauli X matrix $\sigma^x$ with a Pauli rotation and a Pauli Z matrix $\sigma^z$. There will, of course, be an associated time cost associated with applying these single qubit rotations.

The second column of the table of FIG. 9 shows how each interaction U can be decomposed into a sequence of three, four or five interactions of weight lower than U. In the case of the top three rows, U is decomposed into three, four or five 2-qubit interactions that can form the sequence of 2-qubit unitary rotations that are physically implementable on a quantum computer according to step 302 of FIG. 3. In the bottom three rows, U is decomposed into three, four or five lower weight l-qubit interactions where/may still be three or greater. The decomposition in this case will contain at least one 3-qubit or higher interaction involving a coupling that is the product of Pauli-Z rotations. Therefore these 3-qubit or higher qubit interactions can be further decomposed until an interaction sequence of single qubit rotations and two-qubit interactions is reached.

The particular set of decomposed interactions in the second column are derived by ansatz. For other k-qubit interactions other ansatz solutions could be used.

The third column, "Pulse times $t_i$", shows relations of the time constants, $t_1$, $t_2$, $t_i$, or $\phi$ in the exponent of the decomposed interactions in the second column, that result in an exact decomposition of U. These interaction times will also directly correspond to the time taken for a quantum computer to perform the interactions.

With reference to the first row of the table, the desired 3-qubit interaction is thus decomposed into three two-qubit interactions, as in the diagram of FIG. 4a. Specifically, the first two-qubit interaction is achieved by applying a Pauli-Z operation ($\sigma^z$) to the first qubit and a Pauli-x operation ($\sigma^x$) to the second qubit for a time $\pi/4$. The second two-qubit interaction is achieved by applying a Pauli-y operation ($\sigma^y$) to the second qubit and a Pauli-z operation ($\sigma^z$) to the third qubit for a time $\delta$. The third two-qubit interaction is achieved by applying a Pauli-z operation ($\sigma^z$) to the first qubit and a Pauli-x operation ($\sigma^x$) to the second qubit for a time $\pi/4$. Each of the Pauli operations $\sigma^x$, $\sigma^y$ and $\sigma^z$ are equivalent up to Pauli rotation—that is, one can perform a Pauli-x or Pauli-y operation by performing e.g. a Pauli-z operation and a single qubit rotation.

The overall time cost referred to in Equation (6) is then derived based on mathematical identities for the exponential function of operators and sums of operators, and exploiting commutation and anticommutation properties thereof. Based on the explicit form of an ansatz (e.g. $A_1B_2A_2B_1$), these exponential identities are exploited to derive relations between the individual interaction time variables. To obtain asymptotics and first order dependencies for the overall pulse time, the (often involved) implicit relations between the $t_i$ are expanded around their exact solutions.

For a time evolution operator $U=\exp(iT\sigma_z^{\otimes 3})$, there is a decomposition of U into two qubit interactions with $\mathcal{J}_{cost}(U) \leq 2\sqrt{2T}$. For a time evolution operator $$U = \exp\left(iT\sigma_z^{\otimes 4}\right),$$

there is a decomposition of U into two qubit interactions with $\mathcal{J}_{cost}(U) \leq 7\sqrt[3]{T}$.

For the decompositions of depth 3 (the first row) there are single solutions to the pulse times $t_1$ and $t_2$ that result in an exact decomposition of U. For the decompositions of depths 4 and 5, there are a family of solutions that result in the exact decomposition of U.

Figures 5A, 5B, 5C:
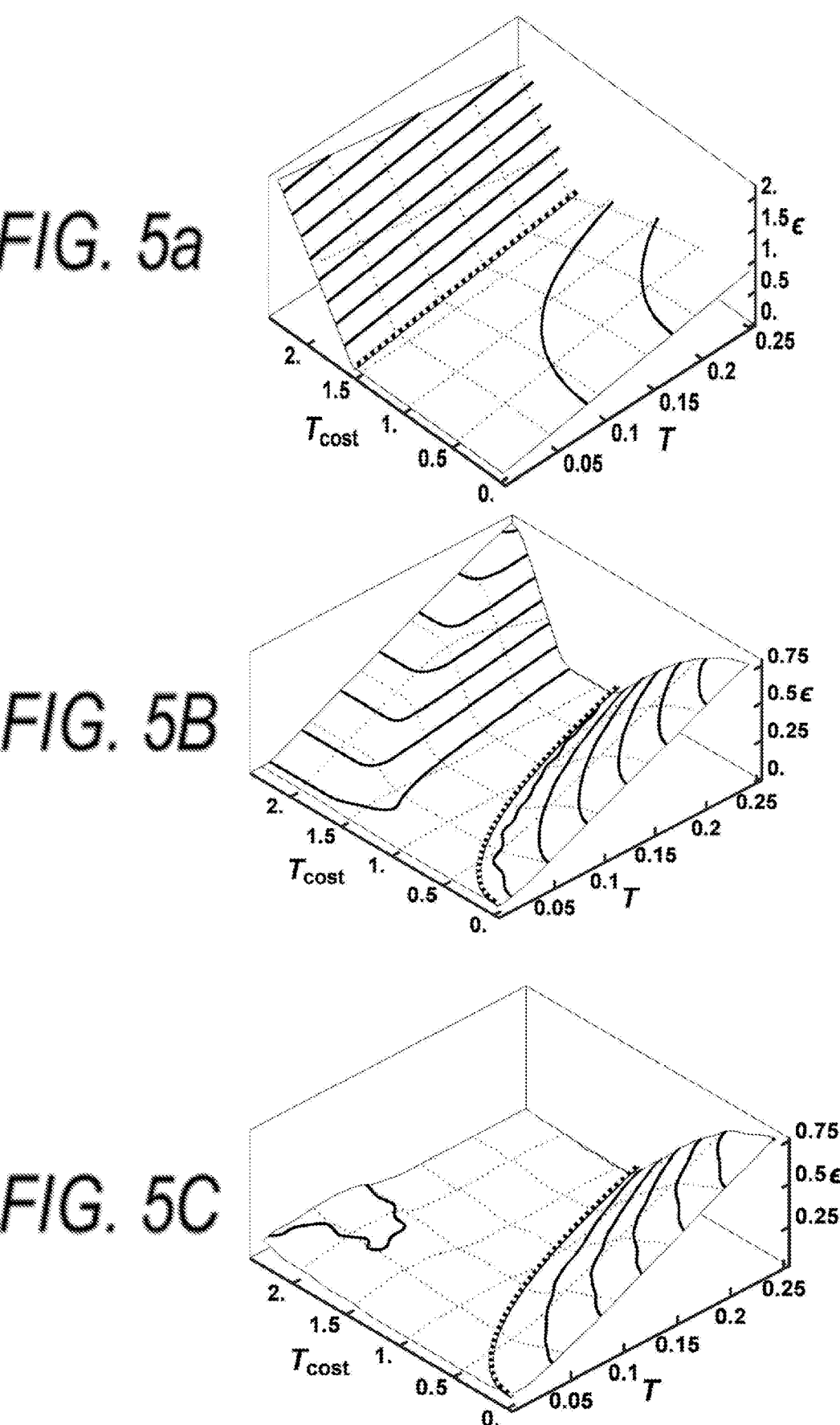
FIG. 5*a*, FIG. 5*b* and FIG. 5*c* show graphs plotting decomposition errors for the decomposition of a 3-qubit interaction at depths 3, 4 and 5.

FIG. 5a and FIG. 5b each show a 3-D graph of a numerical calculation that plots the gate decomposition error (against the overall pulse time $\bar{t}$ and simulation time T, for the decomposition of $U=\exp(iT\sigma^z\otimes\sigma_z\otimes\sigma^z)$ of depths 3 and 4. The dashed line on each graph denotes the overall pulse time that gives an exact decomposition for a given time T. As can be seen, for a given time T, U can be decomposed into interactions having an overall lower interaction time, if U is decomposed into four 2-qubit interactions rather than three 2-qubit interactions.

FIG. 5c shows a similar graph to FIG. 5a and FIG. 5b but this time for decomposition depth 5. In this case the dashed line on FIG. 5c shows the exact decomposition of U at depth 4. As can be seen, there is not much difference in interaction time for an exact decomposition of U for depths 4 and 5.

As will be appreciated by the skilled person, the time variable shown in the table of FIG. 9 are all defined relative to the time T but T may be substituted for, e.g., $\delta$. Once a combined interaction sequence has been determined (step 304 of FIG. 3), a control sequence is determined. Determining the control sequence may comprise determining which physical operations (e.g. a microwave pulse or a laser pulse) must be applied to which qubit in which order and for how long based on the ansatz solutions.

As an example, if the multiqudit algorithm to be performed is the time dynamics simulation of a Hamiltonian H, then the Hamiltonian may first be expressed as a series of k-qudit interactions via Trotter decomposition. For example, each of the M non-commuting elements $H_i$ of the Hamiltonian H may comprise a k-qudit coupling. Each of the k-qudit couplings may be decomposed into a sequence of single-qudit unitary rotations and two-qudit unitary rotations by comparing the k-qudit interaction to a parametrised interaction sequence, such as one of the ansatz solutions shown in FIG. 9. A Trotter step of the multiqudit algorithm may thus be re-designed as an ordered sequence of such ansatz solutions (a combined interaction sequence). The multiqudit algorithm may therefore be redesigned as the repetition of the combined interaction sequence several (e.g. $T/\delta$) times.

The selection of the parametrised interaction sequence may be constrained by the physical constraints of the quantum computer on which the algorithm is to be performed. The ordering of the terms in combined interaction sequence and the respective interaction time variables for the sequence may then be used to determine a control sequence for implementing the algorithm on the quantum computer.

Figure 6:
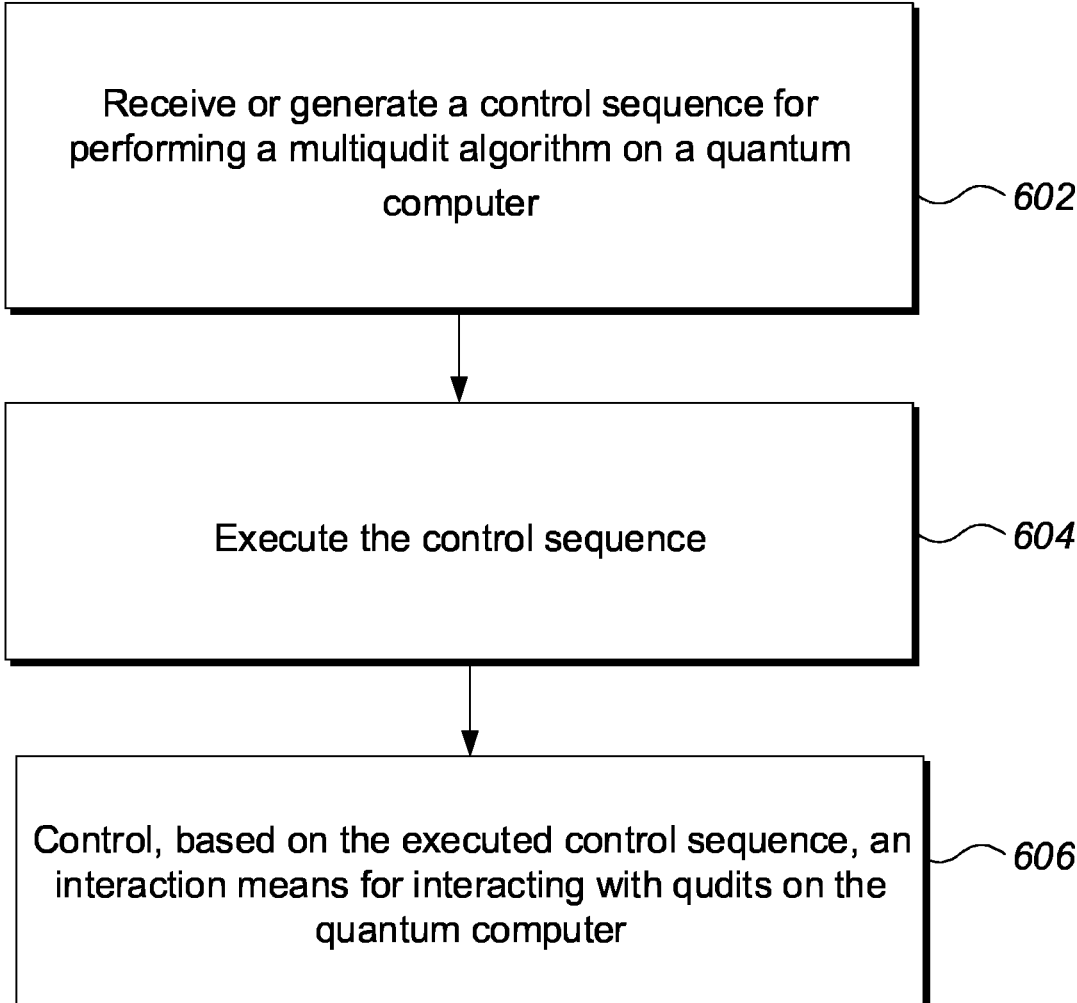
FIG. 6 shows a flow chart of a method to perform a multiqudit algorithm on a quantum computer.

FIG. 6 illustrates a flow chart 600 of a method performable by a controller apparatus for performing a multiqudit algorithm on a quantum computer such as quantum computer 140 of FIG. 1. The controller apparatus may correspond to the controller apparatus 130 of FIG. 1 and/or the apparatus 200' of FIG. 2b.

At step 602, a control sequence determined according to any of the methods described herein is received, for example, by the controller 290'. The control sequence, or part of it, may have been generated locally at the controller apparatus 130, or else it may have been received externally, either via transmission over a network 110 from one or more computer apparatuses 120, or from an external memory, such as a hard drive. The control sequence may be received in any suitable format.

At step 604, the control sequence is executed. The execution step 604 can be done by any conventional software or hardware means, such as a user providing an input to a GUI on the controller apparatus 130 or a user pressing a mechanical button. The executing step 604, or part of it, may also occur implicitly or occur simultaneously with step 602 or step 606.

The control sequence is thus applied to the quantum computer (step 606). For example, the controller 290 in the controller apparatus 200' may control the interaction means 280 based on the executed control sequence, so that the quantum computer 140 performs the multiqudit algorithm corresponding to the executed control sequence. How the executed control sequence is used to control the interaction means 280 depends upon the architecture of the quantum computer 140.

FIGS. 7a-7c and FIGS. 8a-8c show two different example qubit architectures of a quantum computer 140 which may be controlled by the interaction means 280 in step 606, and examples of k-qubit interactions and their decomposed 2-qubit interactions map onto the architecture of the quantum computer 140.

Figure 7A:
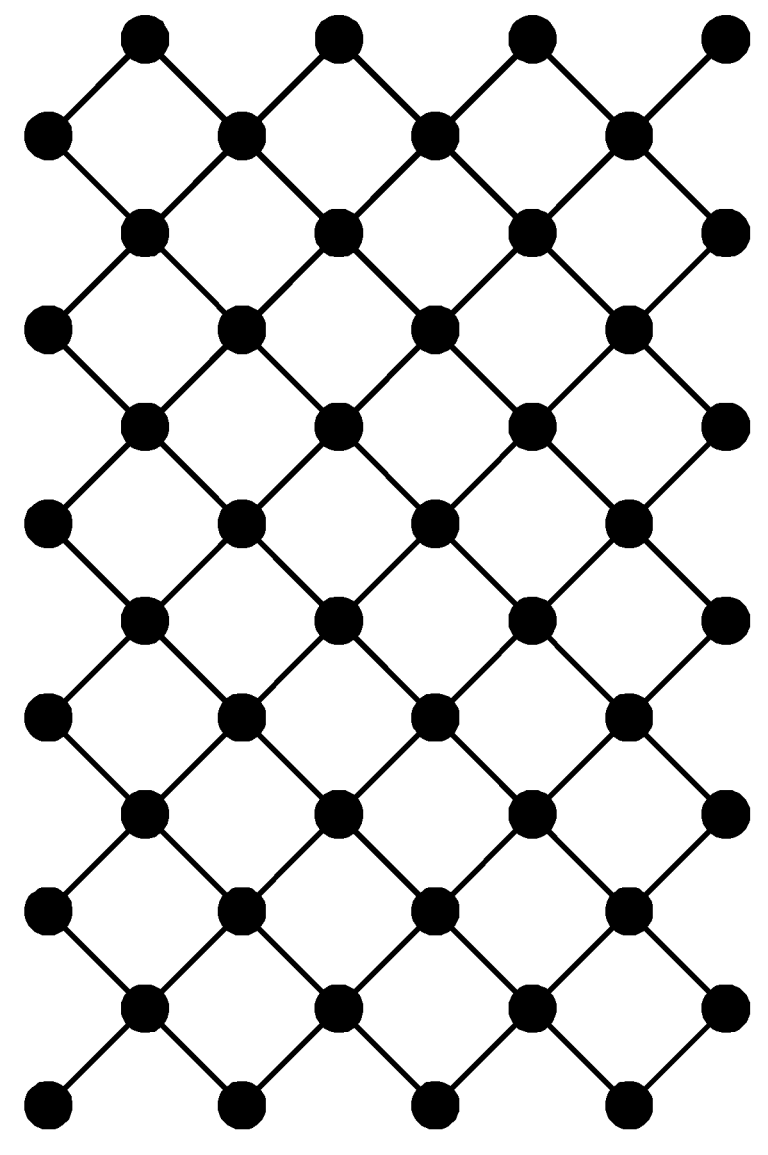
FIG. 7*a* illustrates a quantum computer architecture in which two-qubit interactions are restricted to diagonal nearest-neighbour interactions.

FIG. 7a illustrates an array of qubits according to a quantum computing architecture in which the qubits have only diagonal nearest neighbour connectivity. Such a lattice arrangement of qubits is common in, for example, quantum computers based on superconducting qubits. FIG. 7a illustrates 48 qubits (represented by black dots). The lines connecting the qubits represent the allowed interactions between the qubits. For this type of architecture, the type of 2-qubit interactions is limited by the locations of the qubits, such that the quantum computer 140 can only perform 2-qubit interactions on two diagonally neighbouring qubits.

Figure 7B:
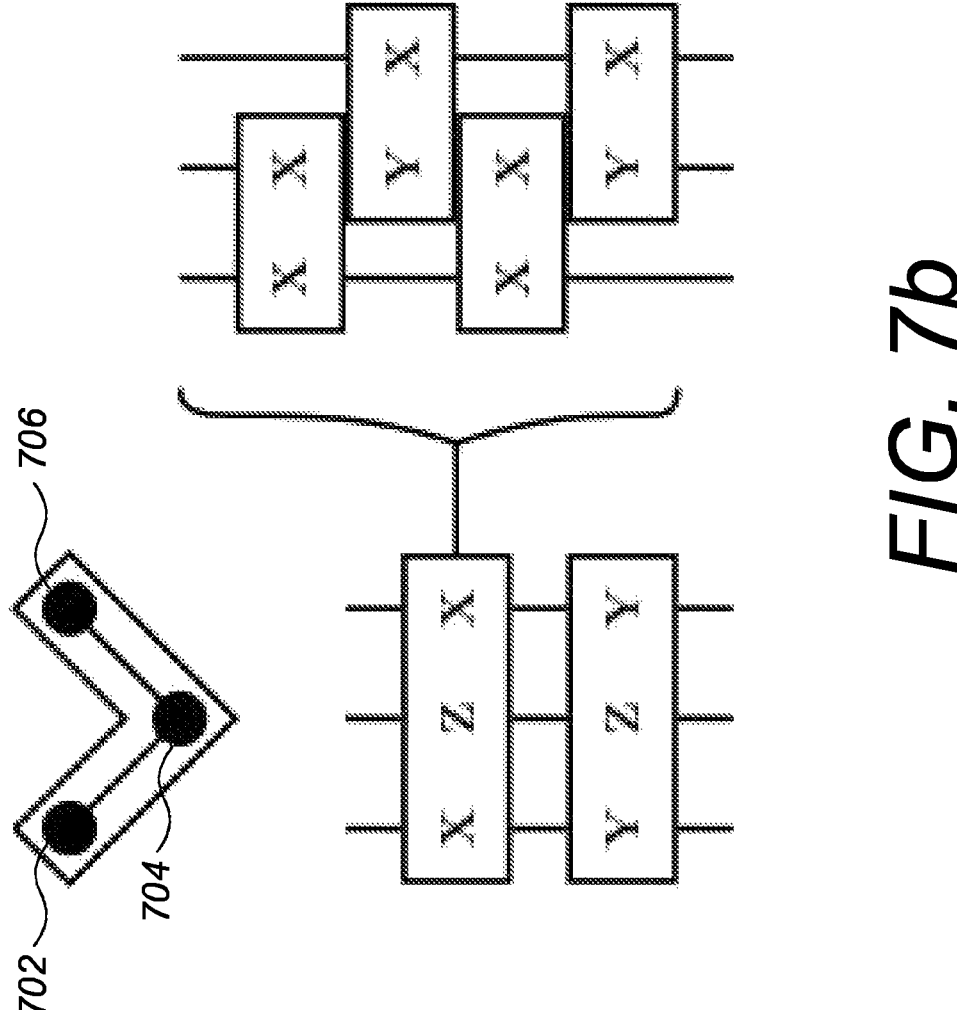
FIG. 7*b* illustrates an example decomposition which may be carried out on the architecture of FIG. 7*a;*

In FIG. 7b, a 3-qubit interaction acting on 3 neighbouring qubits and its decomposed interaction sequence of 2-qubit interactions are mapped onto the architecture of FIG. 7a. The 3-qubit interaction shown here is denoted as 'XZX' (that is, $\sigma^x$ applied to qubit 702, $\sigma^z$ applied to qubit 704 and $\sigma^x$ applied to qubit 706). This 3-qubit interaction corresponds to an interaction of the form U=exp $(iT\sigma^x \otimes \sigma^z \otimes \sigma^x)$ applied to qubits 702, 704 and 706 respectively. This 3-qubit interaction is decomposed into four 2-qubit interactions, taking into account the particular architecture of the quantum computer so that all the 2-qubit interactions act on neighbouring qubits.

Figure 7C:
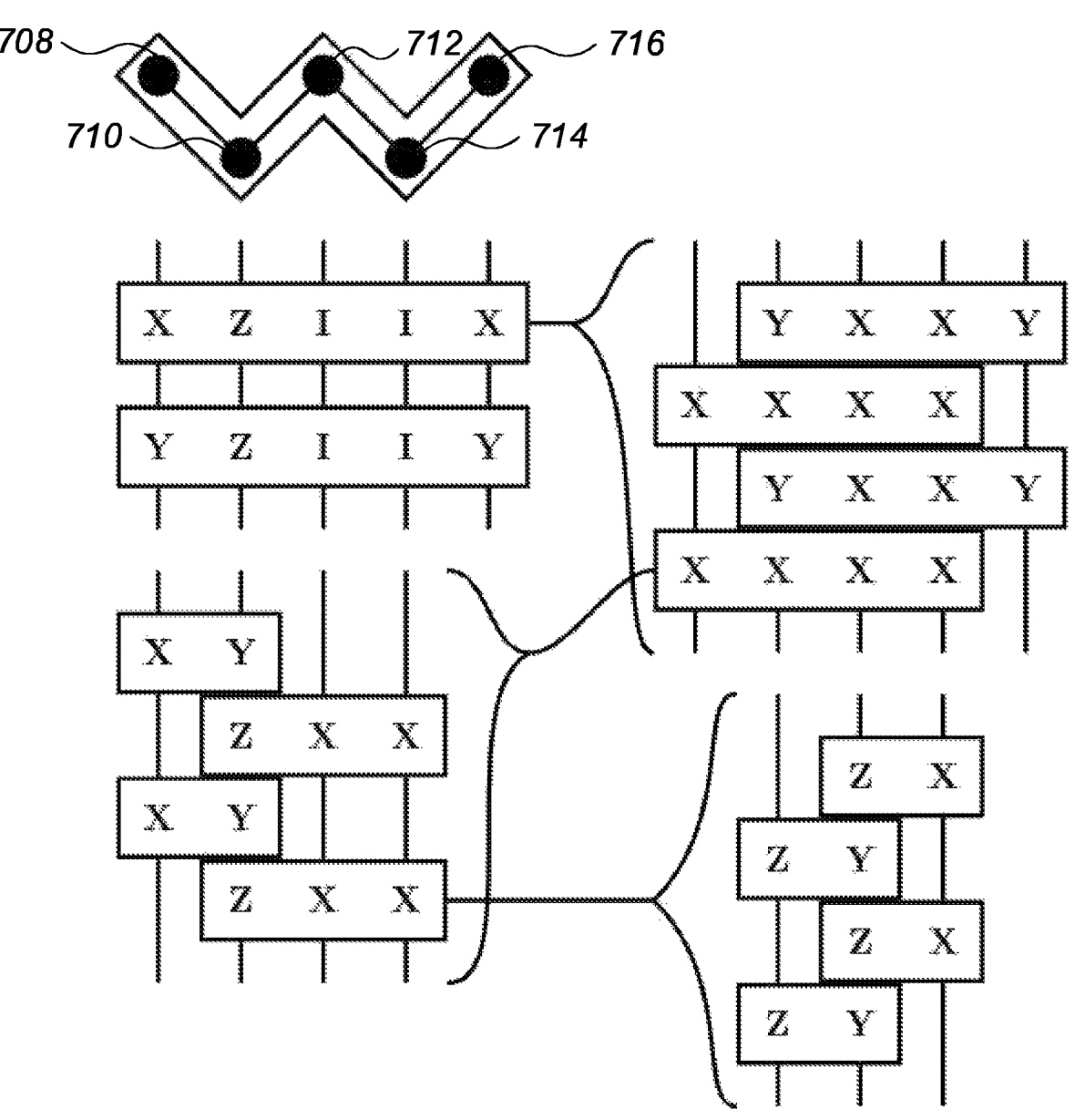
FIG. 7*c* illustrates an example decomposition which may be carried out on non-neighbouring qubits on the architecture of FIG. 7*a;*

In FIG. 7c, a 3-qubit interaction acting on 3 non-neighbouring qubits and its decomposed interaction sequence of 2-qubit interactions are mapped onto the architecture of FIG. 7a. Due to the physical constraints of the architecture, the intervening qubits are to be considered when decomposing the 3-qubit interaction. In this example, the interaction thus corresponds to a Pauli string of length 5 (and weight 3). In this case, a 3-qubit interaction 'XZX' acting on qubits 708, 710 and 716 must instead be replaced by an equivalent Pauli string of length 5, denoted as 'XZIIX', acting on qubits 708 to 716 respectively, where the two identity operators act on qubits 712 and 714. This interaction generates a time evolution of the form U=exp $(iT\sigma^x \otimes \sigma^z \otimes 1 \otimes 1 \otimes \sigma^x)$ operating on qubits 708 to 716 respectively. As shown in the Figure, each interaction is decomposed into a series of interactions corresponding to Pauli strings of weight four. Each interaction corresponding to a Pauli string of weight four is then decomposed into a series of interactions corresponding to Pauli strings of weights 2 or 3. Each interaction corresponding to a Pauli string of weight three is then decomposed into a series of interactions corresponding to Pauli strings of weight two—that is, into two-qubit operations that are physically implementable on the constrained physical architecture of FIG. 7a.

Figure 8A:
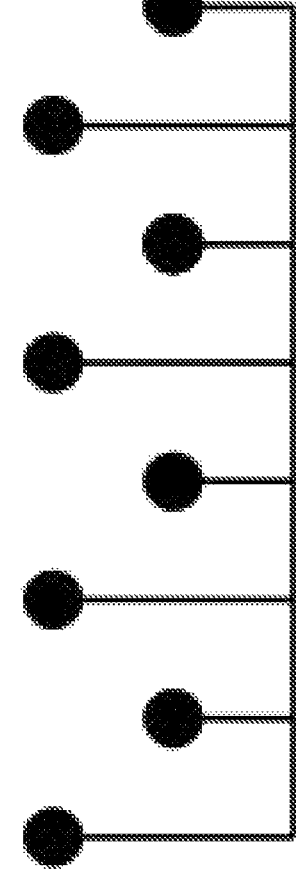
FIG. 8*a* illustrates a quantum computer architecture in which pairwise interactions between any pair of qubits are implementable.

FIG. 8a illustrates an array of qubits according to a quantum computing architecture in which the qubits have all-to-all pairwise connectivity. Such an arrangement of qubits is common in, for example, quantum computers based on trapped ions. The black dots represent qubits and the lines connecting the qubits represent the allowed interactions between the qubits. For this type of architecture, the type of 2-qubit interactions are not restricted by the qubit location and any pairwise interaction of qubits may be performed.

Figure 8B:
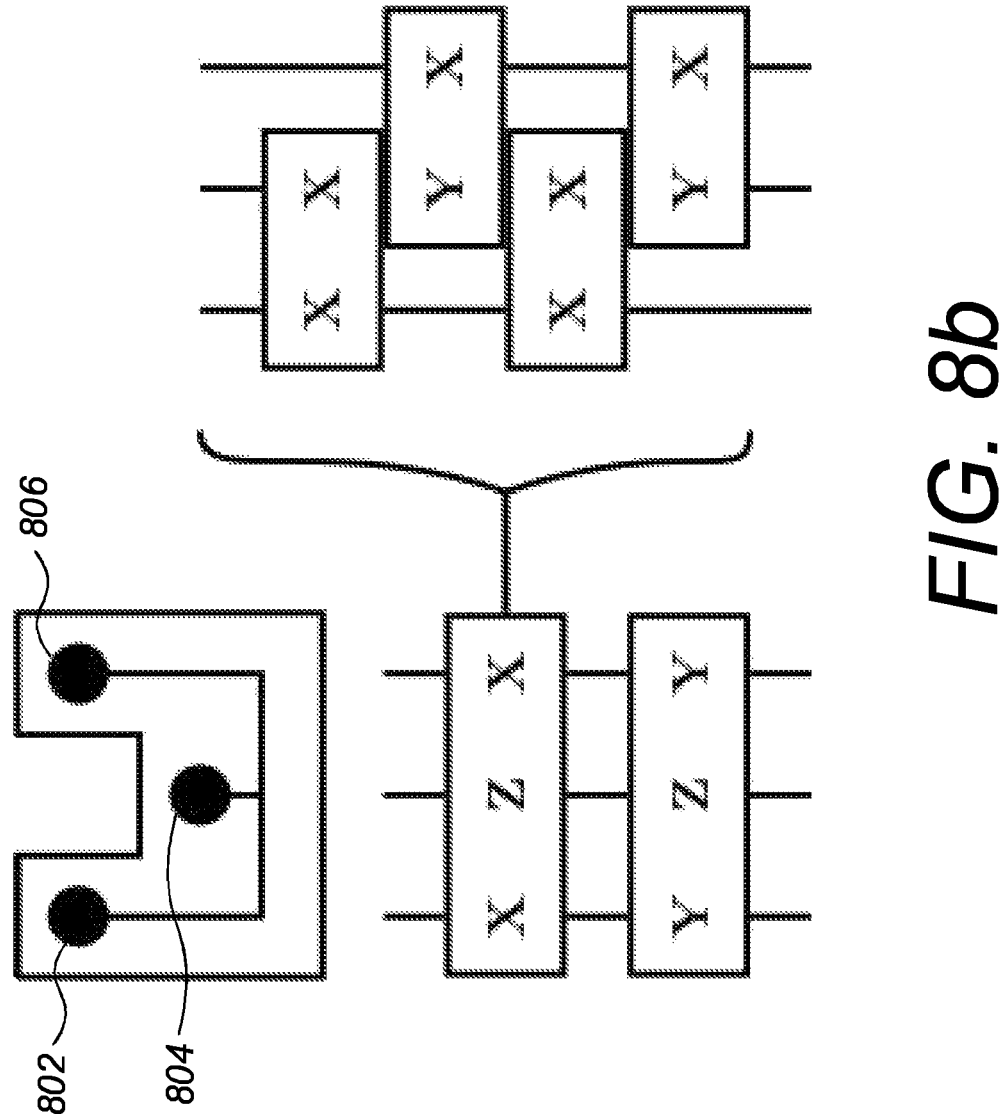
FIG. 8*b* illustrates an example decomposition which may be carried out on neighbouring qubits in the architecture of FIG. 8*a;*

In FIG. 8b, a 3-qubit interaction on 3 neighbouring qubits and its decomposed interaction sequence of 2-qubit interactions are mapped onto the architecture of FIG. 8a. The 3-qubit interaction shown decomposed here is denoted as 'XZX' (that is, $\sigma^x$ applied to qubit 802, oz applied to qubit 804 and ox applied to qubit 806). This 3-qubit interaction generates a time evolution of the form U=exp $(iT\sigma^x \otimes \sigma^z \otimes \sigma^x)$ operated on qubits 802, 804 and 806 respectively. This 3-qubit interaction is decomposed into four 2-qubit interactions as shown in the figure, taking into account the particular architecture of the quantum computer, which in this case is flexible so that the 2-qubit interactions are not required to act on neighbouring qubits.

Figure 8C:
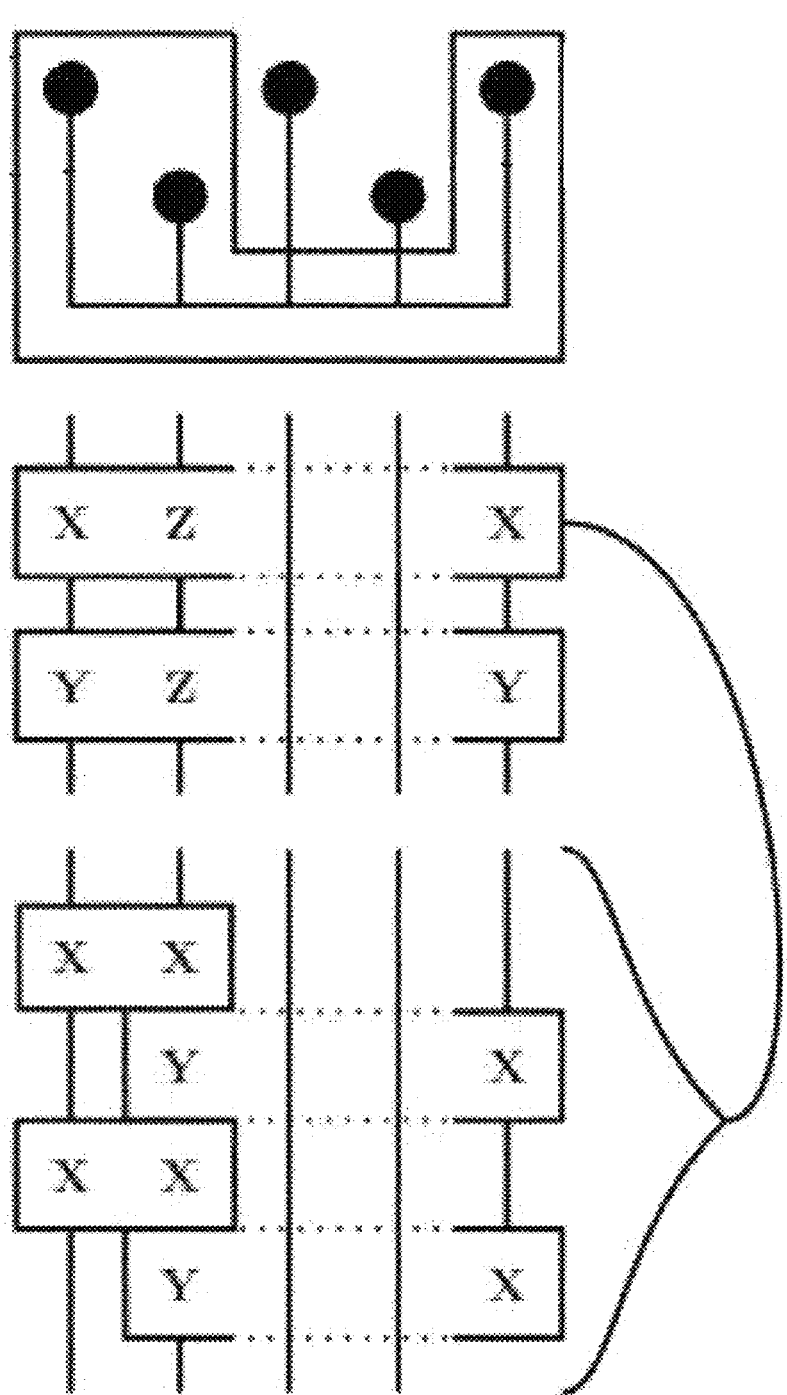

In FIG. 8c, a 3-qubit interaction on 3 non-neighbouring qubits and its decomposed interaction sequence of 2-qubit interactions are mapped onto the architecture of FIG. 8a. The case here is analogous to that of FIG. 7c; however, because of the flexibility of the architecture, the 3-qubit interaction can be performed similarly to the 3 neighbouring case in FIG. 8b. Hence, for the architecture of FIG. 8a, the decomposition of XZX on non-neighbouring qubits here requires only one iteration of decomposition, and the resulting interaction sequence consists of only four 2-qubit interactions, rather than the dozens of 2-qubit interactions resulting from the equivalent decomposition on the superconducting architecture shown in FIG. 7c.

The above teachings may be applied to, for example, the simulation of the time dynamics of the Fermi-Hubbard Hamiltonian. The state-of-the-art quantum circuit-model algorithm for simulating the time dynamics of the 2D Fermi-Hubbard model on a 5×5 lattice requires $\approx 10^5$ gates-far beyond any hardware likely to be available soon. By re-designing the time dynamics simulation algorithm "one level below" the circuit model, a 5×5 Fermi-Hubbard time-dynamics simulation can be achieved on NISQ-class hardware, with ≈60 qubits and the equivalent of circuit depth ≈3000.

Variations of the described embodiments are envisaged, as would be appreciated by the skilled person. For example, the skilled person would appreciate that while the discussion above has revolved around the use of the described techniques for simulating the time dynamics of Hamiltonian operators, the described methods are suitable for many types of multiqudit algorithm. Notable examples include the Variational Quantum Eigensolver (VQE) algorithm, and other quantum optimization algorithms.

It will be appreciated that embodiments of the present invention can be realised in the form of hardware, software or a combination of hardware and software. Any such software may be stored in the form of volatile or non-volatile storage, such as a storage device like a ROM, whether erasable or rewritable or not, or in the form of memory, such as RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method and a machine-readable storage storing such a program. Still further, embodiments of the present invention may be conveyed electronically via any medium such as a communication signal carried over a wired or wireless connection and embodiments suitably encompass the same.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of determining a control sequence for performing a multiqudit algorithm on a quantum computer, the multiqudit algorithm expressible as a series of one or more k-qudit interactions, the method comprising:

for each of the k-qudit interactions, decomposing the k-qudit interaction into a sequence of single-qudit unitary rotations and/or two-qudit unitary rotations from a continuous family of controllable unitary rotations generated by underlying physical interactions in hardware of the quantum computer subject to a specified minimum interaction time, said sequence being physically implementable on the quantum computer, wherein decomposing the k-qudit interaction comprises comparing the k-qudit interaction to a parametrised interaction sequence, and wherein the decomposing the k-qudit interaction further comprises adjusting parameters of the parametrised interaction sequence to determine the sequence of single-qudit unitary rotations and/or two-qudit unitary rotations from the continuous family of controllable unitary rotations;

combining the sequences to form a combined interaction sequence:

determining, based on the combined interaction sequence, the control sequence for performing the multiqudit algorithm on the quantum computer; and communicating, via a network, the control sequence to a controller circuit, causing the controller circuit to execute the control sequence on the quantum computer and the quantum computer to perform the multiqudit algorithm.

2. The method according to claim 1, further comprising, before the decomposing, expressing the multiqudit algorithm as the series of one or more k-qudit interactions.

3. The method according to claim 1, wherein at least one k-qudit interaction comprises a 3-qudit interaction.

4. The method according to claim 1, wherein at least one k-qudit interaction comprises a 4-qudit interaction.

5. The method according to claim 1, wherein the multiqudit algorithm is a multiqubit algorithm expressible as a series of one or more k-qubit interactions.

6. The method according to claim 1, wherein the k-qudit interactions comprise operations that are composed of a product of Pauli-type interactions.

7. The method according claim 1, wherein the multiqudit algorithm comprises a simulation of a many-body Hamiltonian.

8. The method according to claim 1, further comprising, after the combining step:

repeating the combined interaction sequence at least once to form a repeated interaction sequence, and wherein determining the control sequence based on the combined interaction sequence comprises determining the control sequence based on the repeated interaction sequence.

9. The method according to claim 1, wherein the quantum computer comprises a superconducting quantum computer or wherein the quantum computer comprises an ion trap quantum computer.

10. A non-transitory computer-readable medium having instructions stored thereon which, when read by a processor, cause the processor to execute the method according to claim 1.

11. Computing apparatus comprising:

one or more processors; and one or more memories having instructions stored therein which, when executed by the one or more processors, causes the one or more processors to execute the method according to claim 1.

12. A method of performing a multiqudit algorithm on a quantum computer, the method comprising:

executing the control sequence determined according to the method of claim 1.

13. A non-transitory computer-readable medium having instructions stored thereon which, when read by a processor of a computing device, cause the computing device to execute the control sequence determined according to claim 1.

14. A computing apparatus comprising:

interaction hardware for interacting configured to generate an initial quantum state of a quantum computer and manipulate qudits of the quantum computer to achieve different internal states of the quantum computer; and controller circuitry configured to:

receive the control sequence determined according to claim 1; and process the control sequence to control the interaction hardware according to the control sequence in order to perform a multiqudit algorithm on the quantum computer.

* * * * *